US011531505B2

(12) United States Patent
Miyake

(10) Patent No.: US 11,531,505 B2
(45) Date of Patent: *Dec. 20, 2022

(54) NON-TRANSITORY COMPUTER-READABLE MEDIUM STORING COMPUTER-READABLE INSTRUCTIONS FOR TERMINAL DEVICE AND TERMINAL DEVICE

(71) Applicant: Brother Kogyo Kabushiki Kaisha, Aichi-Ken (JP)

(72) Inventor: Takeshi Miyake, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/209,332

(22) Filed: Mar. 23, 2021

(65) Prior Publication Data

US 2021/0208829 A1 Jul. 8, 2021

Related U.S. Application Data

(63) Continuation of application No. 16/574,891, filed on Sep. 18, 2019, now Pat. No. 10,976,971.

(30) Foreign Application Priority Data

Sep. 28, 2018 (JP) .............................. JP2018-184176

(51) Int. Cl.
*G06F 3/12* (2006.01)
*H04W 12/06* (2021.01)
(Continued)

(52) U.S. Cl.
CPC .......... *G06F 3/1236* (2013.01); *G06F 3/1209* (2013.01); *G06F 3/1238* (2013.01);
(Continued)

(58) Field of Classification Search
None
See application file for complete search history.

(56) References Cited

U.S. PATENT DOCUMENTS 10,169,587 B1 ‡ 1/2019 Nix .................. H04L 9/0838
10,687,338 B1 ‡ 6/2020 Henry .................. H04W 24/02
(Continued)

FOREIGN PATENT DOCUMENTS

JP 2011-114377 A 6/2011
JP 2016-213573 A 12/2016
(Continued)

OTHER PUBLICATIONS

Wi-Fi Alliance Technical Committee P2P Task Group, "Wi-Fi Peer-to Peer (P2P) Technical Specification", Version 1.1, pp. 1-159, 2010.‡
(Continued)

*Primary Examiner* — Beniyam Menberu
(74) *Attorney, Agent, or Firm* — Banner & Witcoff, Ltd.

(57) ABSTRACT

A terminal device may obtain a public key and target identification information from a communication device, search for the communication device via a wireless interface of the terminal device, based on the target identification information and a result of the search for the communication device, determine whether the communication device is to establish a wireless connection with an external device or with the terminal device, in a case where it is determined that the communication device is to establish the wireless connection with the external device, send first connection information to the communication device, in a case where it is determined that the communication device is to establish the wireless connection with the terminal device, send second connection information different from the first connection information to the communication device, establish the wireless connection with the communication device via the
(Continued)

wireless interface by using the second connection information.

14 Claims, 19 Drawing Sheets

(51) Int. Cl.
H04W 76/10 (2018.01)
H04W 12/04 (2021.01)
G06K 15/02 (2006.01)
G06K 7/10 (2006.01)
G06K 7/14 (2006.01)
H04L 67/51 (2022.01)

(52) U.S. Cl.
CPC ....... *G06F 3/1292* (2013.01); *G06K 7/10722* (2013.01); *G06K 7/1417* (2013.01); *H04L 67/51* (2022.05); *H04W 12/04* (2013.01); *H04W 12/06* (2013.01); *H04W 76/10* (2018.02)

(56) References Cited

U.S. PATENT DOCUMENTS

| | | | |
|---|---|---|---|
| 10,976,971 B2 * | 4/2021 | Miyake | H04W 12/06 |
| 2011/0122835 A1 | 5/2011 | Naito et al. | |
| 2014/0094211 A1 * | 4/2014 | Ren | H04W 60/00 455/517 |
| 2017/0295448 A1 | 10/2017 | McCann et al. | |
| 2018/0069718 A1 ‡ | 3/2018 | Terao | H04W 84/12 |
| 2018/0069851 A1 | 3/2018 | Terao | |
| 2018/0077255 A1 ‡ | 3/2018 | Goto | H04L 63/20 |
| 2018/0124860 A1 | 5/2018 | Moritomo | |
| 2018/0192465 A1 | 7/2018 | Naito et al. | |
| 2018/0213578 A1 ‡ | 7/2018 | Tachibana | H04W 12/0431 |
| 2019/0037620 A1 ‡ | 1/2019 | Hamachi | H04L 63/0428 |
| 2019/0306919 A1 ‡ | 10/2019 | Miyake | G06F 3/1204 |
| 2020/0089446 A1 ‡ | 3/2020 | Shiotani | G06F 3/1238 |
| 2020/0214059 A1 ‡ | 7/2020 | Suzuki | H04W 12/04 |
| 2020/0220718 A1 ‡ | 7/2020 | Tsuji | H04N 1/4413 |

FOREIGN PATENT DOCUMENTS

| | | | | |
|---|---|---|---|---|
| JP | 2017-028460 A | ‡ | 2/2017 | ........... G06K 7/1413 |
| JP | 2017-028460 A | | 2/2017 | |
| JP | 2018026721 | * | 2/2018 | .............. H04L 9/16 |
| JP | 2018-37979 A | | 3/2018 | |
| WO | 2017-126311 A1 | | 7/2017 | |
| WO | WO-2017-126311 A1 | ‡ | 7/2017 | .............. H04W 8/22 |

OTHER PUBLICATIONS

Jul. 19, 2022—(JP) Notice of Reasons for Refusal—JP App 2018-184176, Eng Tran.

\* cited by examiner
‡ imported from a related application (Case A: Network Access between Printer and AP)

(Case B: Network Access with Printer)

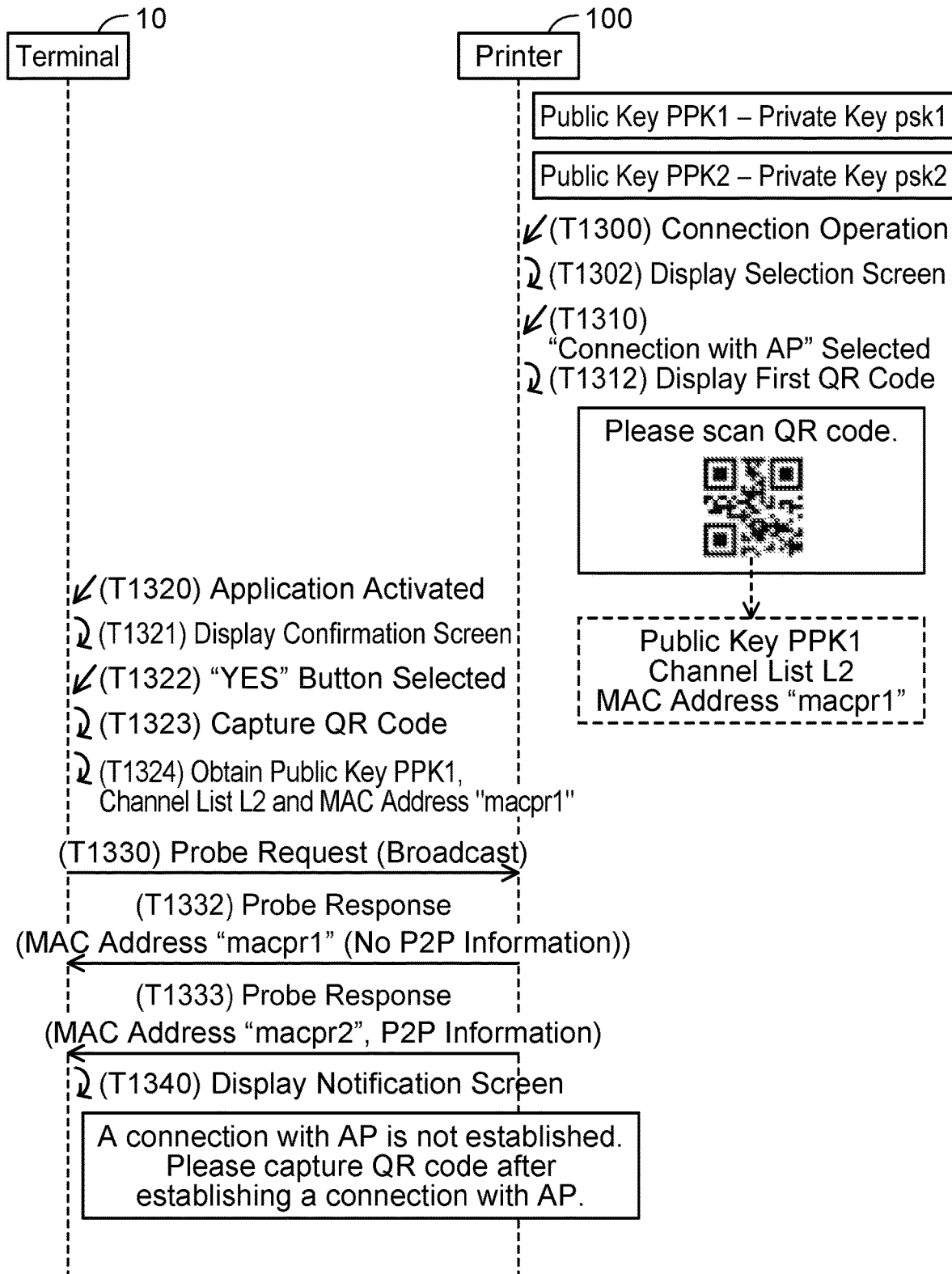

NON-TRANSITORY COMPUTER-READABLE MEDIUM STORING COMPUTER-READABLE INSTRUCTIONS FOR TERMINAL DEVICE AND TERMINAL DEVICE

CROSS-REFERENCE TO RELATED APPLICATION

This application is a continuation of U.S. Ser. No. 16/574,891 filed on Sep. 18, 2019, which claims priority to Japanese Patent Application No. 2018-184176 filed on Sep. 28, 2018, the contents of which are hereby incorporated by reference into the present application.

TECHNICAL FIELD

The disclosure herein discloses a technique for causing a communication device to establish a wireless connection by using a terminal device.

DESCRIPTION OF RELATED ART

Techniques are known that are capable of establishing both a wireless connection between a camera and an access point and a wireless connection between the camera and a smartphone.

In response to receiving an instruction for a connection with the access point from a user, the camera displays a first QR code (registered trademark) including information for establishing a connection with the access point. The smartphone reads the first QR code, executes an authentication process with the camera, and sends a message indicating success of the authentication to the camera. In a case of receiving the message from the smartphone, the camera sends, to the smartphone, capability information indicating that the camera is to establish a connection with the access point. In a case of receiving the capability information from the camera, the smartphone sends, to the camera, communication parameters for establishing a connection with the access point. Thereby, the camera can establish a wireless connection with the access point by using the received communication parameters.

On the other hand, in response to receiving an instruction for a connection with the smartphone from the user, the camera displays a second QR code including information for establishing a connection with the smartphone. The smartphone reads the second QR code, executes an authentication process with the camera, and sends a message indicating success of the authentication to the camera. In a case of receiving the message from the smartphone, the camera sends, to the smartphone, capability information indicating that the camera is to establish a connection with the smartphone. In a case of receiving the capability information from the camera, the smartphone sends, to the camera, communication parameters for connecting with the smartphone. Thereby, the camera can establish a wireless connection with the smartphone by using the received communication parameters.

SUMMARY

The disclosure herein discloses a technique capable of appropriately switching whether a wireless connection is to be established between a communication device and an external device or between the communication device and a terminal device.

The disclosure herein discloses a non-transitory computer-readable medium storing computer-readable instructions for a terminal device. The computer-readable instructions, when executed by a processor of the terminal device, may cause the terminal device to: obtain a public key of a communication device and target identification information identifying the communication device from the communication device, the target identification information being one of first identification information identifying the communication device and second identification information identifying the communication device, the first identification information being for the communication device to establish a wireless connection with an external device that is different from the terminal device, the second identification information being for the communication device to establish a wireless connection with the terminal device; search for the communication device via a wireless interface of the terminal device; based on the target identification information and a result of the search for the communication device, determine whether the communication device is to establish the wireless connection with the external device or the communication device is to establish the wireless connection with the terminal device; after the public key and the target identification information have been obtained from the communication device, send an authentication request in which the public key is used to the communication device via the wireless interface; after the authentication request has been sent to the communication device, receive an authentication response, which is a response to the authentication request, from the communication device via the wireless interface; in a case where it is determined that the communication device is to establish the wireless connection with the external device and the authentication response is received from the communication device, send first connection information to the communication device via the wireless interface, the first connection information being for the communication device to establish the wireless connection with the external device; in a case where it is determined that the communication device is to establish the wireless connection with the terminal device and the authentication response is received from the communication device, send second connection information different from the first connection information to the communication device via the wireless interface, the second connection information being for the communication device to establish the wireless connection with the terminal device; and after the second connection information has been sent to the communication device, establish the wireless connection with the communication device via the wireless interface by using the second connection information.

The above terminal device itself is also novel and useful. A computer program for implementing the terminal device and a method implemented by the terminal device are also novel and useful. Moreover, a communication system comprising the terminal device and the other device (e.g., the communication device, the external device) is novel and useful.

BRIEF DESCRIPTION OF THE DRAWINGS

FIG. 19 shows a sequence diagram of a process of case C in which a notification screen is displayed in the terminal.

EMBODIMENTS

Figure 1:
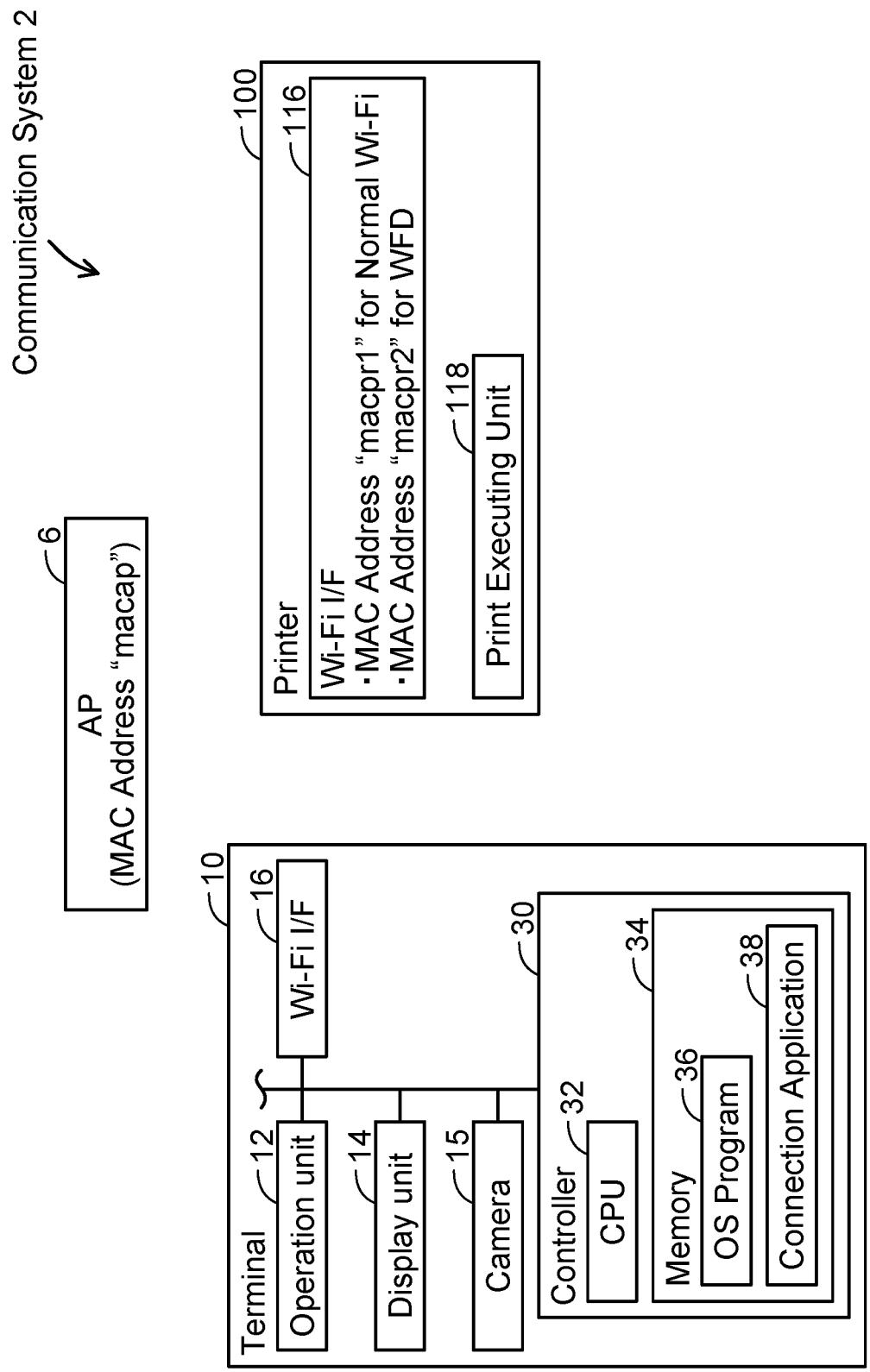
FIG. 1 shows a configuration of a communication system.

Configuration of Communication System 2; FIG. 1

As shown in FIG. 1, a communication system 2 comprises an AP (Access Point) 6, a terminal 10, and a printer 100. In this embodiment, a situation is assumed in which a user uses the terminal 10 to cause the printer 100 to execute printing. In order to send print data representing an image to be printed from the terminal 10 to the printer 100, it is realized to establish a wireless connection between the terminal 10 and the AP 6 as well as establish a wireless connection between the printer 100 and the AP 6, and to establish a wireless connection between the terminal 10 and the printer 100.

Configuration of Terminal 10

The terminal 10 is a portable terminal device such as a cellphone (e.g., a smartphone), a PDA, and a tablet PC. In a variant, the terminal 10 may be a desktop PC, a laptop PC or the like.

The terminal 10 comprises an operation unit 12, a display unit 14, a camera 15, a Wi-Fi interface 16, and a controller 30. The units 12 to 30 are connected to a bus line (reference number omitted). Hereinbelow, an interface will be simply termed "I/F".

The operation unit 12 comprises a plurality of keys. The user can input various instructions to the terminal 10 by operating the operation unit 12. The display unit 14 is a display for displaying various types of information. The display unit 14 also functions as a touch panel (i.e., operation unit) which receives instructions from the user. The camera 15 is a device for capturing images of an object, and in this embodiment, it is especially used to capture QR codes for the AP 6 and the printer 100.

The Wi-Fi I/F 16 is a wireless interface configured to execute wireless communication according to a Wi-Fi scheme. The Wi-Fi scheme is a wireless communication scheme for executing wireless communication according to 802.11 standard of IEEE (the Institute of Electrical and Electronics Engineers, Inc.) and standards complying thereto (such as 802.11a, 11b, 11g, 11n, 11ac, etc.). The Wi-Fi I/F 16 especially supports Device Provisioning Protocol (DPP) scheme that has been established by the Wi-Fi Alliance. The DPP scheme is described in the standard "Device Provisioning Protocol Technical Specification Version 1.0" created by the Wi-Fi Alliance, and is a wireless communication scheme for easily establishing a wireless connection according to Wi-Fi between a pair of devices (such as the printer 100 and the AP 6, or the printer 100 and the terminal 10) by using the terminal 10.

Further, the Wi-Fi I/F 16 supports a WFD (Wi-Fi Direct (registered trademark)) scheme established by the Wi-Fi Alliance. That is, the terminal 10 is a WFD device. The WFD scheme is a wireless communication scheme described in the standard "Wi-Fi Peer-to-Peer (P2P) Technical Specification Version 1.1" created by the Wi-Fi Alliance. The WFD standard defines three states as states of a WFD device supporting the WFD scheme: a Group Owner state (hereinbelow termed "G/O state"), a client state, and a device state. The WFD device is capable of selectively operating in one of the above three states. That is, the terminal 10 can establish a wireless connection according to a normal Wi-Fi scheme that is not the WFD scheme, and a wireless connection according to the WFD scheme. Below, a wireless connection according to the normal Wi-Fi scheme and a wireless connection according to the WFD scheme will be termed "normal Wi-Fi connection" and "WFD connection", respectively.

The controller 30 comprises a CPU 32 and a memory 34. The CPU 32 executes various processes in accordance with programs 36, 38 stored in the memory 34. The memory 34 is constituted of a volatile memory, a non-volatile memory and the like, and stores the OS program 36 and the connection application 38 (hereinbelow simply termed "app 38").

The OS program 36 is a program for controlling basic operations of the terminal 10. The app 38 is a program for establishing a Wi-Fi connection between a pair of devices according to the DPP scheme. The app 38 is installed in the terminal 10, for example, from a server on the Internet provided by a vendor of the printer 100.

Configuration of Printer 100

The printer 100 is a peripheral device (e.g., a peripheral device of the terminal 10, etc.) capable of executing a print function. The printer 100 comprises a Wi-Fi I/F 116 and a print executing unit 118. The Wi-Fi I/F 116 is physically one I/F. The Wi-Fi I/F 116 is the same as the Wi-Fi I/F 16 of the terminal 10. That is, the Wi-Fi I/F 116 supports the DPP scheme and the WFD scheme. A MAC address "macpr1" for establishing a normal Wi-Fi connection and a MAC address "macpr2" for establishing a WFD connection are assigned to the Wi-Fi I/F 116. The MAC address "macpr1" and the MAC address "macpr2" are different MAC addresses from each other. The print executing unit 118 comprises a print mechanism of an ink jet scheme, a laser scheme, or the like.

Figure 2:
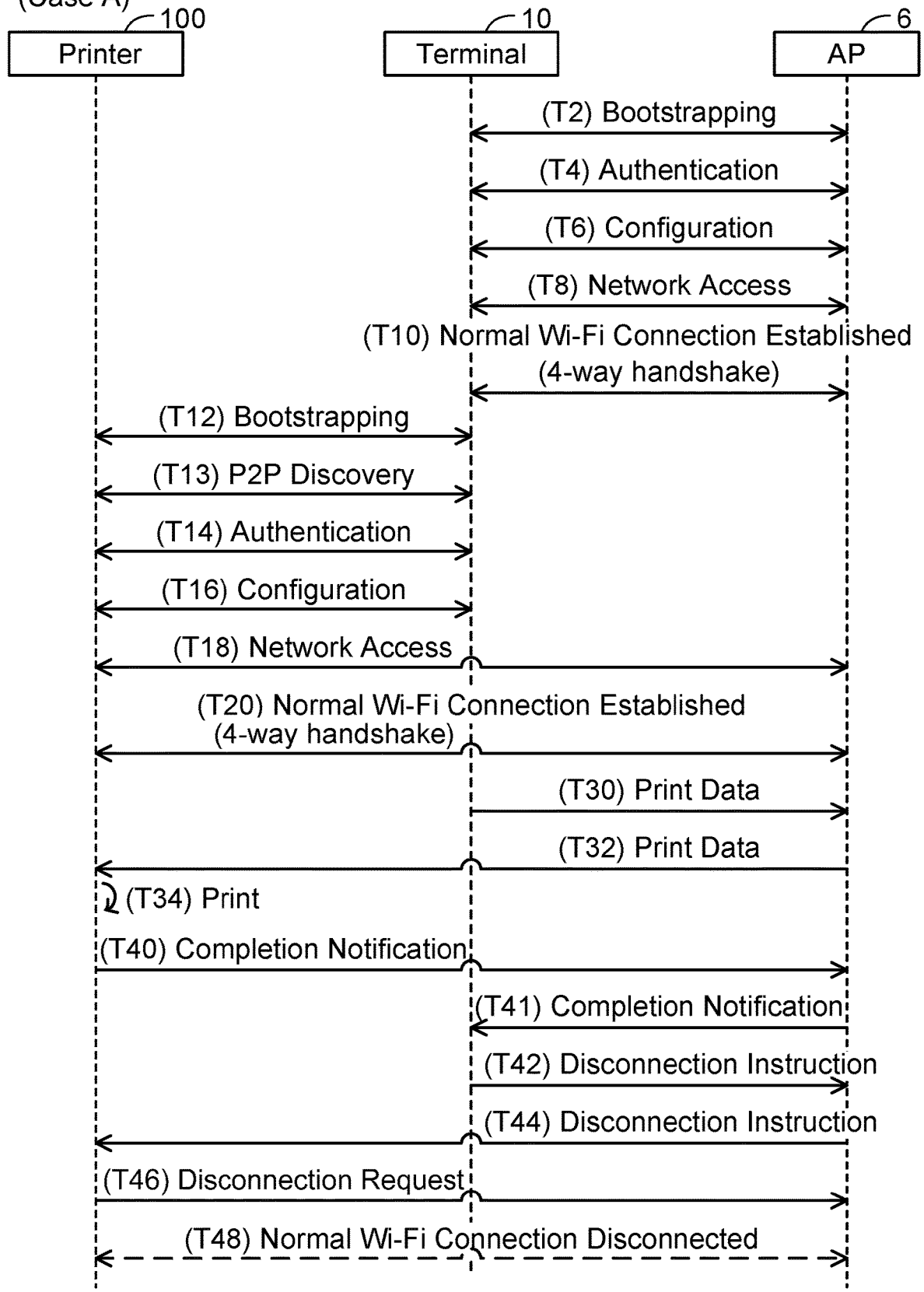
FIG. 2 shows an explanatory diagram for showing an outline of case A in which a wireless connection is established between a printer and an AP.
Figure 3:
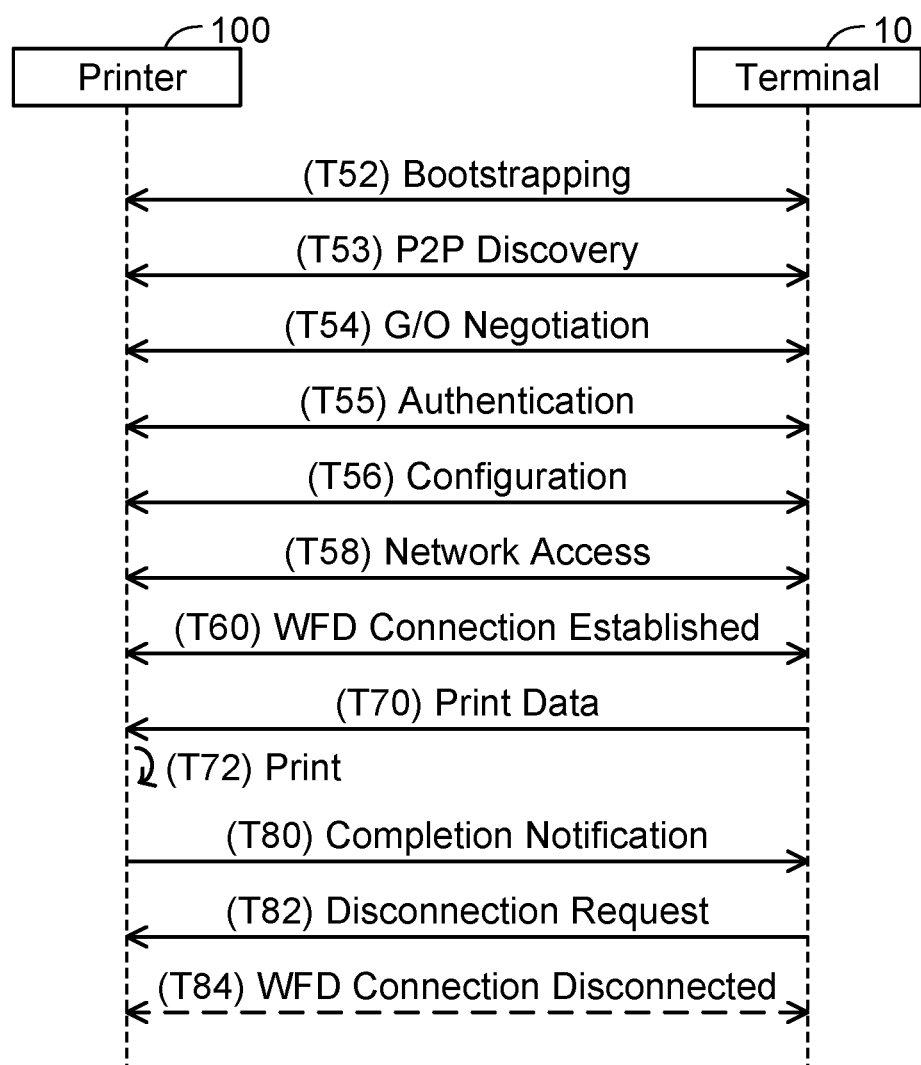
FIG. 3 shows an explanatory diagram for showing an outline of case B in which a wireless connection is established between a terminal and the printer.

Outline of Present Embodiment; FIG. 2 and FIG. 3

Next, an outline of the present embodiment will be described with reference to FIG. 2 and FIG. 3. Although it has been described above that the terminal 10 and the printer 100 support the DPP scheme, the AP 6 also supports the DPP scheme. Further, a MAC address "macap" is assigned to the AP 6. Below, to facilitate understanding, operations executed by the CPU of each device (e.g., the CPU 32) will be described with each device (e.g., the terminal 10) as the subject of action, not with the CPU as the subject of action.

Outline of Case A; FIG. 2

First, an outline of case A in which a normal Wi-Fi connection is established between the printer 100 and the AP 6 will be described with reference to FIG. 2. In case A, establishment of normal Wi-Fi connections between the AP 6 and each of the terminal 10 and the printer 100 is realized by the devices 6, 10, 100 executing communication according to the DPP scheme.

In T2, the terminal 10 executes Bootstrapping (hereinbelow simply termed "BS") according to the DPP scheme with the AP 6. The BS is a process of providing, from the AP 6 to the terminal 10, information that is used in Authentication (hereinbelow simply termed "Auth") of T4 to be described later in response to a QR code adhered to the AP 6 being captured by the terminal 10.

In T4, the terminal 10 executes the Auth according to the DPP scheme with the AP 6 by using the information obtained in the BS of T2. This Auth is a process for the terminal 10 and the AP 6 to authenticate their communication counterparts.

In T6, the terminal 10 executes Configuration (hereinbelow simply termed "Config") according to the DPP scheme with the AP 6. This Config is a process of sending, to the AP 6, information for the AP 6 to establish a Wi-Fi connection. Specifically, the terminal 10 creates a Configuration Object for AP (hereinbelow, Configuration Object will be simply termed "CO"), and sends the CO for AP to the AP 6. As a result, the CO for AP is stored in the AP 6.

In T8, the terminal 10 executes Network Access (hereinbelow simply termed "NA") according to the DPP scheme with the AP 6. In this NA, the terminal 10 creates a first CO for terminal and stores it in the memory 34. Then, the terminal 10 and the AP 6 use the first CO for terminal and the CO for AP to share a connection key for establishing a Wi-Fi connection between the terminal 10 and the AP 6.

In T10, the terminal 10 and the AP 6 execute communication of 4way-handshake. During at least a part of the communication of 4way-handshake, the terminal 10 and the AP 6 communicate encrypted information that is encrypted by the connection key shared in the NA of T8. Then, in a case where the encrypted information is successfully decrypted, a normal Wi-Fi connection is established between the terminal 10 and the AP 6. Thereby, the terminal 10 participates, as a child station, in a wireless network formed by the AP 6. In a variant, communication of SAE (Simultaneous Authentication of Equals, commonly called "Dragonfly") may be used instead of the communication of 4way-handshake.

Next, in T12, the terminal 10 executes BS according to the DPP scheme with the printer 100. This BS is a process of providing, from the printer 100 to the terminal 10, information that is to be used in Auth of T14 to be described later in response to a first QR code displayed in the printer 100 being captured by the terminal 10.

In T13, the terminal 10 executes P2P Discovery (hereinbelow simply termed "PDis") for searching for the printer 100. In this PDis, the terminal 10 sends a Probe Request (hereinbelow simply termed "PReq") by broadcast via the Wi-Fi I/F 16 and receives a Probe Response (hereinbelow simply termed "PRes") from the printer 100. This PRes includes the MAC address "macpr1" for establishing a normal Wi-Fi connection.

In T14, the terminal 10 executes Auth according to the DPP scheme with the printer 100 by using the information obtained in the BS of T12. This Auth is a process for the terminal 10 and the printer 100 to authenticate their communication counterparts.

In T16, the terminal 10 executes Config according to the DPP scheme with the printer 100. This Config is a process of sending, to the printer 100, information for the printer 100 to establish a normal Wi-Fi connection. Specifically, the terminal 10 creates a first CO for printer and sends it to the printer 100. As a result, the first CO for printer is stored in the printer 100.

In T18, the printer 100 and the AP 6 execute NA according to the DPP scheme by using the first CO for printer and the CO for AP. This NA is a process for sharing, between the printer 100 and the AP 6, a connection key for establishing a normal Wi-Fi connection between the printer 100 and the AP 6.

In T20, the printer 100 and the AP 6 execute communication of 4way-handshake. During at least a part of the communication of 4way-handshake, the printer 100 and the AP 6 communicate encrypted information that is encrypted by the connection key shared in the NA of T18. Then, in a case where the encrypted information is successfully decrypted, a normal Wi-Fi connection is established between the printer 100 and the AP 6. Thereby, the printer 100 participates, as a child station, in the wireless network formed by the AP 6. As a result, the terminal 10 and the printer 100 both have come to participate, as child stations, in the wireless network formed by the AP 6. That is, the terminal 10 and the printer 100 can communicate with each other through the AP 6 by using the wireless network.

In T30 and T32, the terminal 10 sends print data to the printer 100 via the Wi-Fi I/F 16 through the AP 6.

In a case of receiving the print data from the terminal 10 via the Wi-Fi I/F 116 through the AP 6 in T32, the printer 100 executes printing according to the print data in T34. Then, in T40 and T41, the printer 100 sends a completion notification indicating that the printing has been completed to the terminal 10 via the Wi-Fi I/F 116 through the AP 6.

In a case of receiving the completion notification from the printer 100 via the Wi-Fi I/F 16 through the AP 6 in T41, the terminal 10 sends in T42 and T44, to the printer 100 via the Wi-Fi I/F 16 through the AP 6, a disconnection instruction for disconnecting the normal Wi-Fi connection between the printer 100 and the AP 6.

In a case of receiving the disconnection instruction from the terminal 10 via the Wi-Fi I/F 116 through the AP 6 in T44, the printer 100 sends in T46, to the AP 6, a disconnection request requesting disconnection of the normal Wi-Fi connection, and disconnects the normal Wi-Fi connection with the AP 6 in T48. Thereby, a state in which the normal Wi-Fi connection remains established between the printer 100 and the AP 6 despite the printing having been completed in the printer 100 can be suppressed from being maintained. When the process of T48 completes, the process of case A ends.

As described above, in the DPP scheme, the user does not have to input, to the terminal 10 and the printer 100, information of the wireless network (e.g., SSID (Service Set Identifier), password, etc.) in which the AP 6 operates as the parent station in order to establish normal Wi-Fi connections between the AP 6 and each of the terminal 10 and the printer 100. Therefore, the user can easily establish normal Wi-Fi connections between the AP 6 and each of the terminal 10 and the printer 100.

Outline of Case B; FIG. 3

Next, an outline of case B in which a WFD connection is established between the terminal 10 and the printer 100 will be described with reference to FIG. 3. In case B, establishment of a WFD connection between the terminal 10 and the printer 100 is realized by each of the devices 10, 100 executing communication in accordance with the DPP scheme.

In T52, the terminal 10 executes BS according to the DPP scheme with the printer 100. This BS is a process of providing, from the printer 100 to the terminal 10, information that is used in Auth of T55 to be described later in response to a second QR code displayed in the printer 100 being captured by the terminal 10.

In T53, the terminal 10 executes PDis for searching for the printer 100. In this PDis, the terminal 10 sends a PReq by broadcast via the Wi-Fi I/F 16 and receives a PRes from the printer 100. This PRes includes the MAC address "macpr2" for establishing a WFD connection and P2P information indicating that the printer 100 supports the WFD scheme.

In T54, the terminal 10 executes G/O Negotiation (hereinbelow simply termed "G/O Nego") with the printer 100 to determine whether to operate in the G/O state or in the client state. In the present case, it is determined that the printer 100 is to operate in the G/O state and the terminal 10 is to operate in the client state. In a variant, it may be determined that the terminal 10 is to operate in the G/O state and the printer 100 is to operate in the client state.

In T55, the terminal 10 executes Auth according to the DPP scheme with the printer 100 by using the information obtained in the BS of T52. This Auth is a process for the terminal 10 and the printer 100 to authenticate their communication counterparts.

In T56, the terminal 10 executes Config according to the DPP scheme with the printer 100. This Config is a process of sending, to the printer 100, information for the printer 100 to establish a WFD connection. Specifically, the terminal 10 creates a second CO for printer and sends it to the printer 100. As a result, the second CO for printer is stored in the printer 100.

In T58, the terminal 10 executes NA according to the DPP scheme with the printer 100. In this NA, the terminal 10 creates a second CO for terminal and stores it in the memory 34. Then, the terminal 10 and the printer 100 use the second CO for terminal and the second CO for printer to share a connection key for establishing a WFD connection between the terminal 10 and the printer 100.

In T60, the terminal 10 establishes a WFD connection with the printer 100 by using the connection key shared in T58, and participates, as a client of the WFD scheme, in a wireless network in which the printer 100 operates as the parent station. Thereby, the terminal 10 and the printer 100 can communicate with each other by using this wireless network, without intermediation of the AP 6.

In T70, the terminal 10 sends print data to the printer 100 via the Wi-Fi I/F 16 by using the WFD connection.

In a case of receiving the print data from the terminal 10 via the Wi-Fi I/F 116 in T70, the printer 100 executes printing according to the print data in T72 and sends a completion notification to the terminal 10 in T80 via the Wi-Fi I/F 116 by using the WFD connection.

In a case of receiving the completion notification from the printer 100 via the Wi-Fi I/F 16 in T80, the terminal 10 sends, to the printer 100 in T82, a disconnection instruction requesting disconnection of the WFD connection, and disconnects the WFD connection with the printer 100 in T84. Thereby, a state in which the WFD connection remains established between the terminal 10 and the printer 100 despite the printing having been completed in the printer 100 can be suppressed from being maintained. When the process of T84 completes, the process of case B ends.

As described above, in the DPP scheme, the user does not have to input, to the terminal 10, information (e.g., SSID, password, etc.) of the wireless network in which the printer 100 operates as the parent station in order to establish a WFD connection between the terminal 10 and the printer 100. Therefore, the user can easily establish a WFD connection between the terminal 10 and the printer 100.

Figure 4:
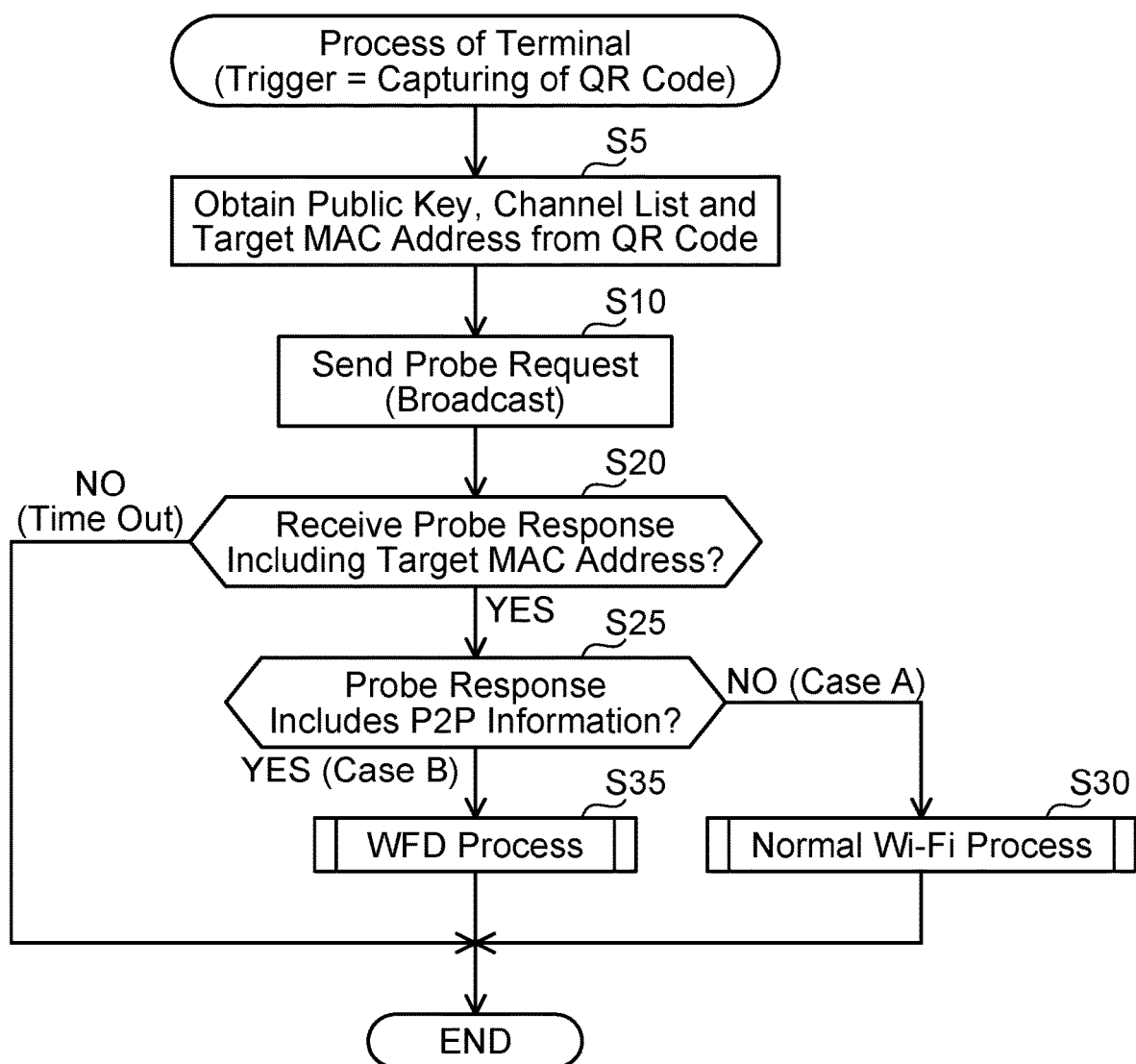
FIG. 4 shows a flowchart of a process executed by the terminal.

Process by Terminal 10; FIG. 4

Next, a process executed by the CPU 32 of the terminal 10 in order to execute the processes of FIG. 2 and FIG. 3 will be described with reference to FIG. 4. The process of FIG. 4 is executed in response to a QR code displayed in the printer 100 being captured by the terminal 10. The QR code displayed in the printer 100 is a code obtained by encoding a public key of the printer 100, a channel list of the printer 100, and a MAC address of the printer 100 (i.e., one of "macpr1" and "macpr2"). Below, the MAC address of the printer 100 (i.e., "macpr1" or "macpr2") will be termed "target MAC address". The channel list is a list of a plurality of communication channels to be used in the Auth (see T14 of FIG. 2 or T55 of FIG. 3) (i.e., a plurality of communication channels that the printer 100 can use).

In S5, the terminal 10 decodes the captured QR code to obtain the public key of the printer 100, the channel list of the printer 100, and the target MAC address.

In S10, the terminal 10 sends a PReq by broadcast via the Wi-Fi I/F 16.

In response to having sent the PReq by broadcast, the terminal 10 receives a plurality of PRes from a plurality of devices (e.g., the printer 100) present in the surroundings of the terminal 10. Each of the plurality of PRes includes a MAC address of a device that is the sender of the PRes. In S20, the terminal 10 determines whether a PRes that includes a MAC address (i.e., the target MAC address) matching the target MAC address obtained in S5 is received from the printer 100. In a case of receiving a PRes including the target MAC address from the printer 100, the terminal 10 determines YES in S20 and proceeds to S25. On the other hand, in a case where a PRes including the target MAC address is not received within a predetermined time, the terminal 10 determines NO in S20 and ends the process of FIG. 4. In the case where the target MAC address cannot be received from the printer 100, it is assumed that the I/F to which the target MAC address is assigned in the printer 100 is in a state of being unable to execute communication (e.g., in a state of not being supplied with power), for example. In the case where the terminal 10 does not receive a PRes including the target MAC address from the printer 100, that is, in the case where the I/F to which the target MAC address is assigned in the printer 100 is in the state of being unable to execute communication, the terminal 10 does not execute processes from S25 onward. Thereby, the processing load of the terminal 10 can be reduced.

In S25, the terminal 10 determines whether the received PRes includes the P2P information. In a case where the received PRes includes the P2P information (YES in S25), the terminal 10 determines that the sender device of the PRes (i.e., the printer 100) supports the WFD scheme and determines that the printer 100 is to establish a WFD connection with the terminal 10. Then, in S35, the terminal 10 executes a WFD process (see FIG. 6) for establishing a WFD connection between the terminal 10 and the printer 100. On the other hand, in a case where the received PRes does not include the P2P information (NO in S25), the terminal 10 determines that the sender device of the PRes does not support the WFD scheme and determines that the printer 100 is to establish a normal Wi-Fi connection with the AP 6. Then, in S30, the terminal 10 executes a normal Wi-Fi process (see FIG. 5) for establishing a normal Wi-Fi connection between the printer 100 and the AP 6. When the process of S30 or S35 completes, the process of FIG. 4 ends.

Figure 5:
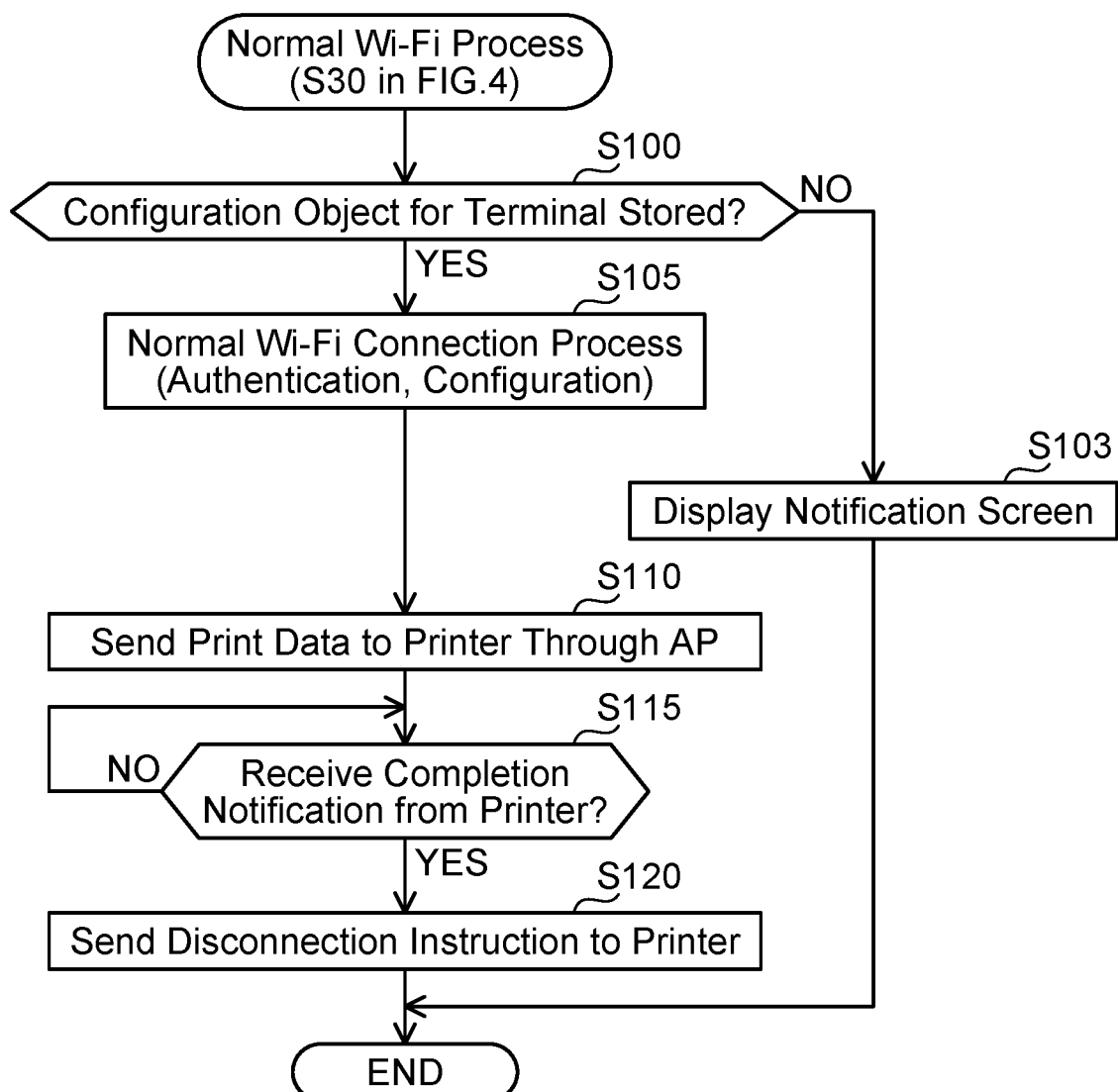
FIG. 5 shows a flowchart of a normal Wi-Fi process.

Normal Wi-Fi Process; FIG. 5

Next, details of processes executed in the normal Wi-Fi process of S30 in FIG. 4 will be described with reference to FIG. 5. In S100, the terminal 10 determines whether a CO for terminal is stored in the memory 34. Here, in a case where the terminal 10 has established a normal Wi-Fi connection with the AP 6 according to the DPP scheme, the first CO for terminal created in the NA with the AP 6 (see T6 of FIG. 2) is stored in the memory 34. That is, a CO for terminal being stored in the memory 34 means that the terminal 10 has executed communication with the AP 6 according to the DPP scheme. In a case where the terminal 10 determines that a CO for terminal is stored in the memory 34 (YES in S100), that is, in a case where communication according to the DPP scheme has been executed between the terminal 10 and the AP 6, the terminal 10 proceeds to S105. On the other hand, in a case where the terminal 10 determines that a CO for terminal is not stored in the memory 34 (NO in S100), that is, in a case where communication according to the DPP scheme has not been executed between the terminal 10 and the AP 6, the terminal 10 proceeds to S103.

In S103, the terminal 10 displays, on the display unit 14, a notification screen for notifying the user that communication according to the DPP scheme is to be executed between the terminal 10 and the AP 6. In the situation where communication according to the DPP scheme has not been executed between the terminal 10 and the AP 6, the AP 6 does not store a CO for AP. In this case, the NA (T18 of FIG. 2) according to the DPP scheme cannot be executed between the printer 100 and the AP 6. Since the notification screen is displayed in the terminal 10 in such a situation, the user can be informed that communication according to the DPP scheme is to be executed between the terminal 10 and the AP 6, and can cause communication according to the DPP scheme to be executed between the terminal 10 and the AP 6.

In S105, the terminal 10 executes a normal Wi-Fi connection process for establishing a normal Wi-Fi connection between the printer 100 and the AP 6. Specifically, the terminal 10 executes various communications (Auth, Config) with the printer 100, and sends the CO for printer to the printer 100 in the Config. As a result, the NA (T18 of FIG. 2) according to the DPP scheme is executed between the printer 100 and the AP by using the CO for AP and the CO for printer, and a connection key is shared between the printer 100 and the AP 6. Then, a normal Wi-Fi connection is established between the printer 100 and the AP 6 by using this connection key (T20 of FIG. 2).

In S110, the terminal 10 sends print data to the printer 100 via the Wi-Fi I/F 16 through the AP 6 (T30 and T32 of FIG. 2).

In S115, the terminal 10 monitors whether the completion notification is received from the printer 100 via the Wi-Fi I/F 16 through the AP 6. In a case of receiving the completion notification from the printer 100 (T41 of FIG. 2), the terminal 10 determines YES in S115 and proceeds to S120.

In S120, the terminal 10 sends the disconnection instruction to the printer 100 via the Wi-Fi I/F 16 through the AP 6 (T42 and T44 of FIG. 2). When the process of S120 completes, the process of FIG. 5 ends.

Figure 6:
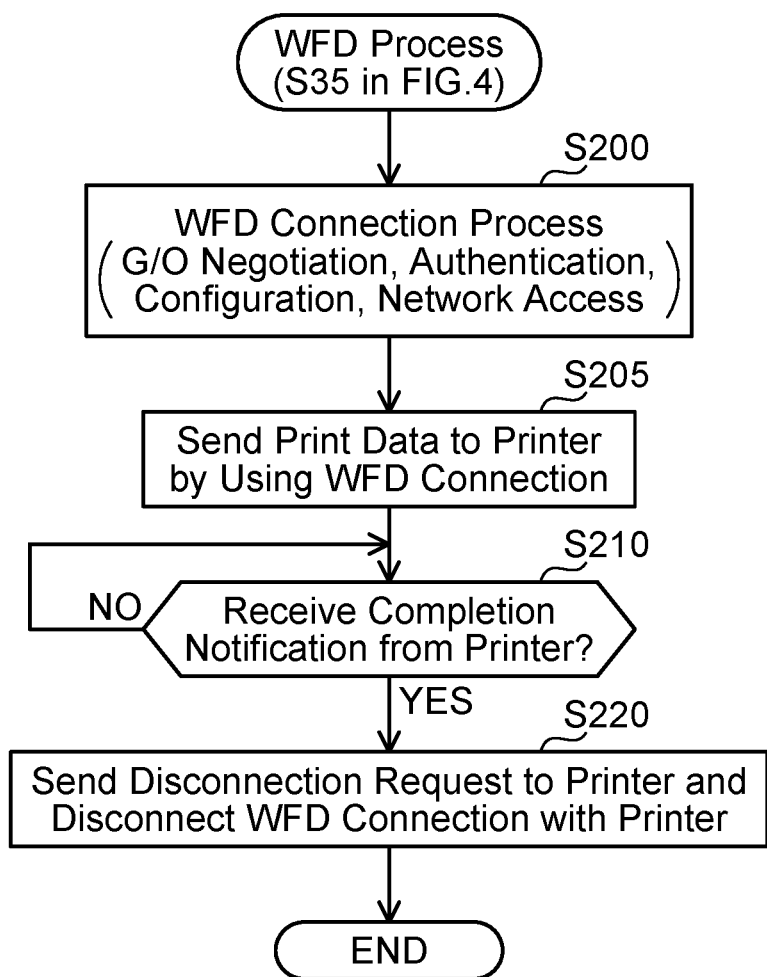
FIG. 6 shows a flowchart of a WFD process.

WFD Process; FIG. 6

Next, details of processes executed in the WFD process of S35 in FIG. 4 will be described with reference to FIG. 6. In S200, the terminal 10 executes a WFD connection process for establishing a WFD connection between the terminal 10 and the printer 100. Specifically, the terminal 10 executes various communications (G/O Nego, Auth, Config, NA, etc.) with the printer 100 and establishes a WFD connection with the printer 100 (T54 to T60 of FIG. 3).

In S205, the terminal 10 sends print data to the printer 100 via the Wi-Fi I/F 16 by using the established WFD connection (T70 of FIG. 3).

In S210, the terminal 10 monitors whether the completion notification is received from the printer 100 via the Wi-Fi I/F 16. In a case of receiving the completion notification from the printer 100 (T80 of FIG. 3), the terminal 10 determines YES in S210 and proceeds to S220.

In S220, the terminal 10 sends the disconnection request to the printer 100 via the Wi-Fi I/F 16 (T82 of FIG. 3), and disconnects the WFD connection with the printer 100 (T84 of FIG. 3). When the process of S220 completes, the process of FIG. 6 ends.

Processes of Case A; FIG. 7 to FIG. 14

Next, details of the processes executed in T2 to T8 and in T12 to T18 of case A in FIG. 2 will be described with reference to FIG. 7 to FIG. 14. First, the BS process executed between the terminal 10 and the AP 6 in T2 of FIG. 2 will be described with reference to FIG. 7. In an initial state of FIG. 7, the AP 6 stores a public key APK1 and a private key ask1 of the AP 6 in advance. Further, a QR code, which is obtained by encoding the public key APK1 of the AP 6, a channel list L1 of the AP 6, and the MAC address "macap" of the AP 6, is adhered to a housing of the AP 6. The channel list L1 is a list of a plurality of communication channels to be used in Auth (see T4 of FIG. 2) (i.e., a plurality of communication channels that the AP 6 can use).

In T100, the terminal 10 activates the app 38 in response to receiving an activate operation for the app 38 from the user. The subsequent processes executed by the terminal 10 are realized by the app 38. Next, in T101, the terminal 10 displays, on the display unit 14, a confirmation screen for confirming with the user whether to execute a connection process for establishing a wireless connection by using the QR code. The confirmation screen includes a YES button indicating that the connection process is to be executed, and a NO button indicating that the connection process is not to be executed.

The terminal 10 activates the camera 15 in T102 in response to the YES button in the confirmation screen being selected by the user, and captures the QR code adhered to the housing of the AP 6 by using the camera 15 in T103. Then, in T104, the terminal 10 decodes the captured QR code to obtain the public key APK1, the channel list L1, and the MAC address "macap". When the process of T104 completes, the process of FIG. 7 ends.

Figure 8:
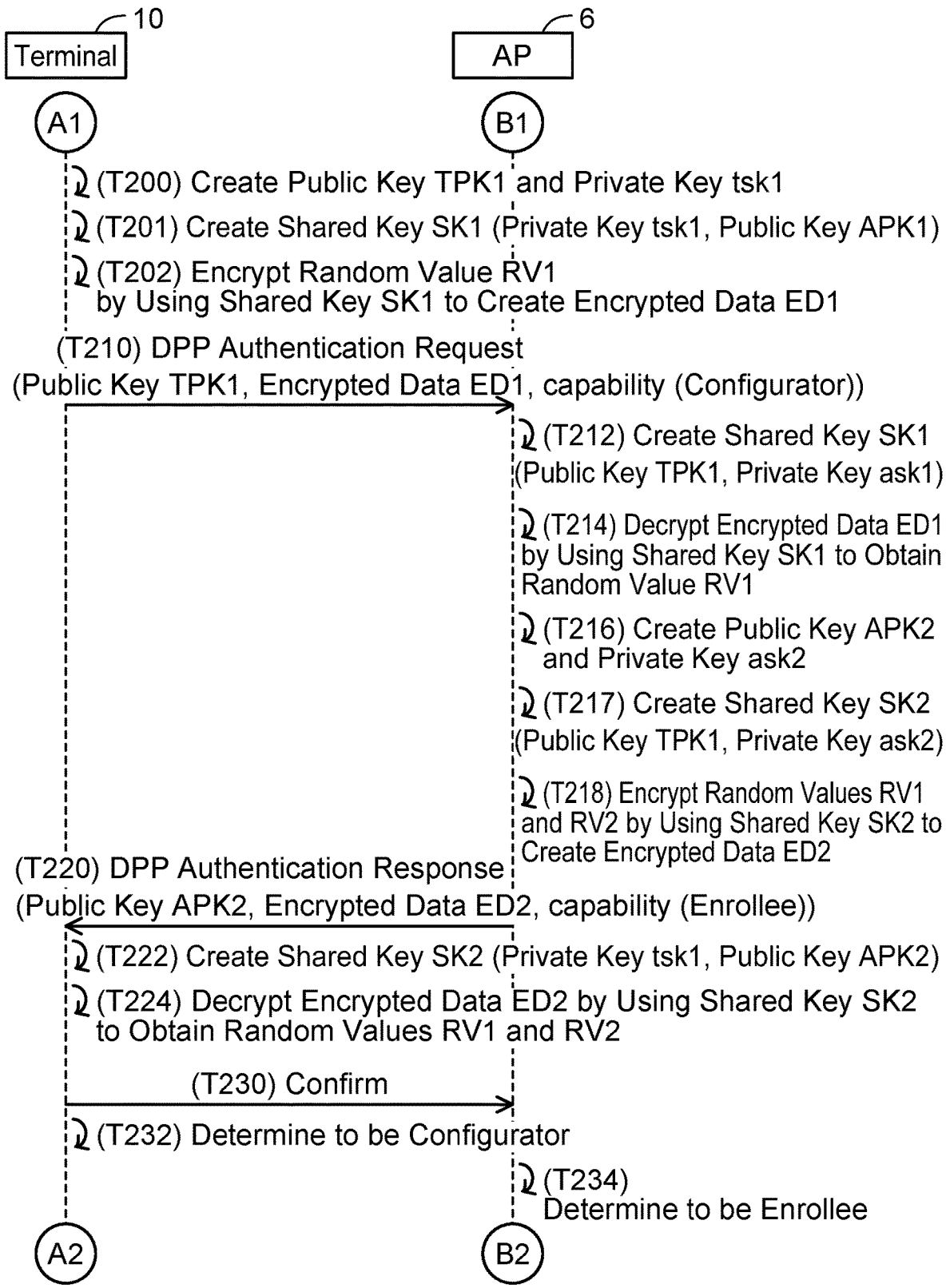
FIG. 8 shows a sequence diagram of an Authentication process with the AP.

Auth with AP 6; FIG. 8

Next, the Auth process executed between the terminal 10 and the AP 6 in T4 of FIG. 2 will be described with reference to FIG. 8.

In T200, the terminal 10 creates a public key TPK1 and a private key tsk1 of the terminal 10. Next, in T201, the terminal 10 creates a shared key SK1 according to ECDH (Elliptic curve Diffie-Hellman key exchange) by using the created private key tsk1 and the public key APK1 of the AP 6 obtained in T104 of FIG. 7. Then, in T202, the terminal 10 encrypts a random value RV1 by using the created shared key SK1 to create encrypted data EDE In T210, the terminal 10 sends a DPP Authentication Request (hereinbelow simply termed "AReq") to the AP 6 via the Wi-Fi I/F 16 with the MAC address "macap" obtained in T104 of FIG. 7 as its destination. The AReq is a signal requesting the AP 6 to execute authentication, and includes the public key TPK1 of the terminal 10 created in T200, the encrypted data ED1 created in T202, and a capability of the terminal 10. Here, the terminal 10 repeatedly sends the AReq to the AP 6 by sequentially using the plurality of communication channels in the channel list L1 obtained in T104 of FIG. 7.

A capability is information that is pre-designated in a device supporting the DPP scheme and includes a value which is one of: a value indicating that the device is capable of operating only as a Configurator according to the DPP scheme, a value indicating that the device is capable of operating only as an Enrollee according to the DPP scheme, and a value indicating that the device is capable of operating as both the Configurator and the Enrollee. The Configurator refers to a device configured to send a CO that is to be used in NA (e.g., T8 of FIG. 2) to the Enrollee in Config (e.g., T6 of FIG. 2). On the other hand, the Enrollee refers to a device that receives the CO that is to be used in the NA from the Configurator in the Config. As described above, in this embodiment, the terminal 10 creates the CO for AP and the CO for printer and sends them respectively to the AP 6 and the printer 100. As such, the capability of the terminal 10 includes the value indicating that it is capable of operating only as the Configurator.

In T210, the AP 6 receives the AReq from the terminal 10. As described above, this AReq is sent with the MAC address "macap" of the AP 6 as the destination. Therefore, the AP 6 can appropriately receive this AReq from the terminal 10. Further, the AP 6 is brought into a state of monitoring that the AReq is received by using one communication channel among the plurality of communication channels in the channel list L1 (i.e., the plurality of communication channels that the AP 6 can use). As described above, the AReq of T210 is sent by sequentially using the plurality of communication channels in the channel list L1. Therefore, the AP 6 can appropriately receive this AReq from the terminal 10.

Next, the AP 6 executes the following process for authenticating the sender of the AReq (i.e., the terminal 10). Specifically, in T212, the AP 6 creates a shared key SK1 according to the ECDH by using the public key TPK1 of the terminal 10 in the AReq and the private key ask1 of the AP 6. Here, the shared key SK1 created by the terminal 10 in T201 is the same as the shared key SK1 created by the AP 6 in T212. Therefore, in T214, the AP 6 can appropriately decrypt the encrypted data ED1 in the AReq by using the created shared key SK1, as a result of which the AP 6 can obtain the random value RV1. In a case where the decryption of the encrypted data ED1 succeeds, the AP 6 determines that the sender of the AReq is the device that captured the QR code of the AP 6, that is, determines that the authentication has succeeded, and executes processes from T216 onward. On the other hand, in a case where the decryption of the encrypted data ED1 does not succeed, the AP 6 determines that the sender of the AReq is not the device that captured the QR code of the AP 6, that is, determines that the authentication has failed, and does not execute the processes from T216 onward.

In T216, the AP 6 creates a new public key APK2 and a new private key ask2 of the AP 6. In a variant, the AP 6 may store the public key APK2 and the private key ask2 in advance. Next, in T217, the AP 6 creates a shared key SK2 according to the ECDH by using the public key TPK1 of the terminal 10 in the AReq of T210 and the created private key ask2 of the AP 6. Then, in T218, the AP 6 encrypts the obtained random value RV1 and a new random value RV2 by using the created shared key SK2 to create encrypted data ED2.

In T220, the AP 6 sends a DPP Authentication Response (hereinbelow simply termed "ARes") to the terminal 10. This ARes includes the public key APK2 of the AP 6 created in T216, the encrypted data ED2 created in T218, and a capability of the AP 6. This capability includes the value indicating that the AP 6 is capable of operating only as the Enrollee.

In T220, the terminal 10 executes the following process for authenticating the sender of this ARes (i.e., the AP 6) in response to receiving the ARes from the AP 6 via the Wi-Fi I/F 16. Specifically, in T222, the terminal 10 creates a shared key SK2 according to the ECDH by using the private key tsk1 of the terminal 10 created in T200 and the public key APK2 of the AP 6 in the ARes. Here, the shared key SK2 created by the AP 6 in T217 is the same as the shared key SK2 created by the terminal 10 in T222. Therefore, in T224, the terminal 10 can appropriately decrypt the encrypted data ED2 in the Ares by using the created shared key SK2, as a result of which the terminal 10 can obtain the random values RV1 and RV2. In a case where the decryption of the encrypted data ED2 succeeds, the terminal 10 determines that the sender of the ARes is the device having the captured QR code, that is, determines that the authentication has succeeded, and executes processes from T230 onward. On the other hand, in a case where the decryption of the encrypted data ED2 does not succeed, the terminal 10 determines that the sender of the ARes is not the device having the captured QR code, that is, determines that the authentication has failed, and does not execute the processes from T230 onward.

In T230, the terminal 10 sends Confirm to the AP 6 via the Wi-Fi I/F 16. The Confirm includes information indicating that the terminal 10 operates as the Configurator and the AP 6 operates as the Enrollee. As a result, the terminal 10 determines to operate as the Configurator in T232, and the AP 6 determines to operate as the Enrollee in T234. When the process of T234 completes, the process of FIG. 8 ends. When the process of FIG. 8 ends, the terminal 10 discards the public key TPK1 and the private key tsk1 (i.e., deletes them from the memory 34).

Figure 9:
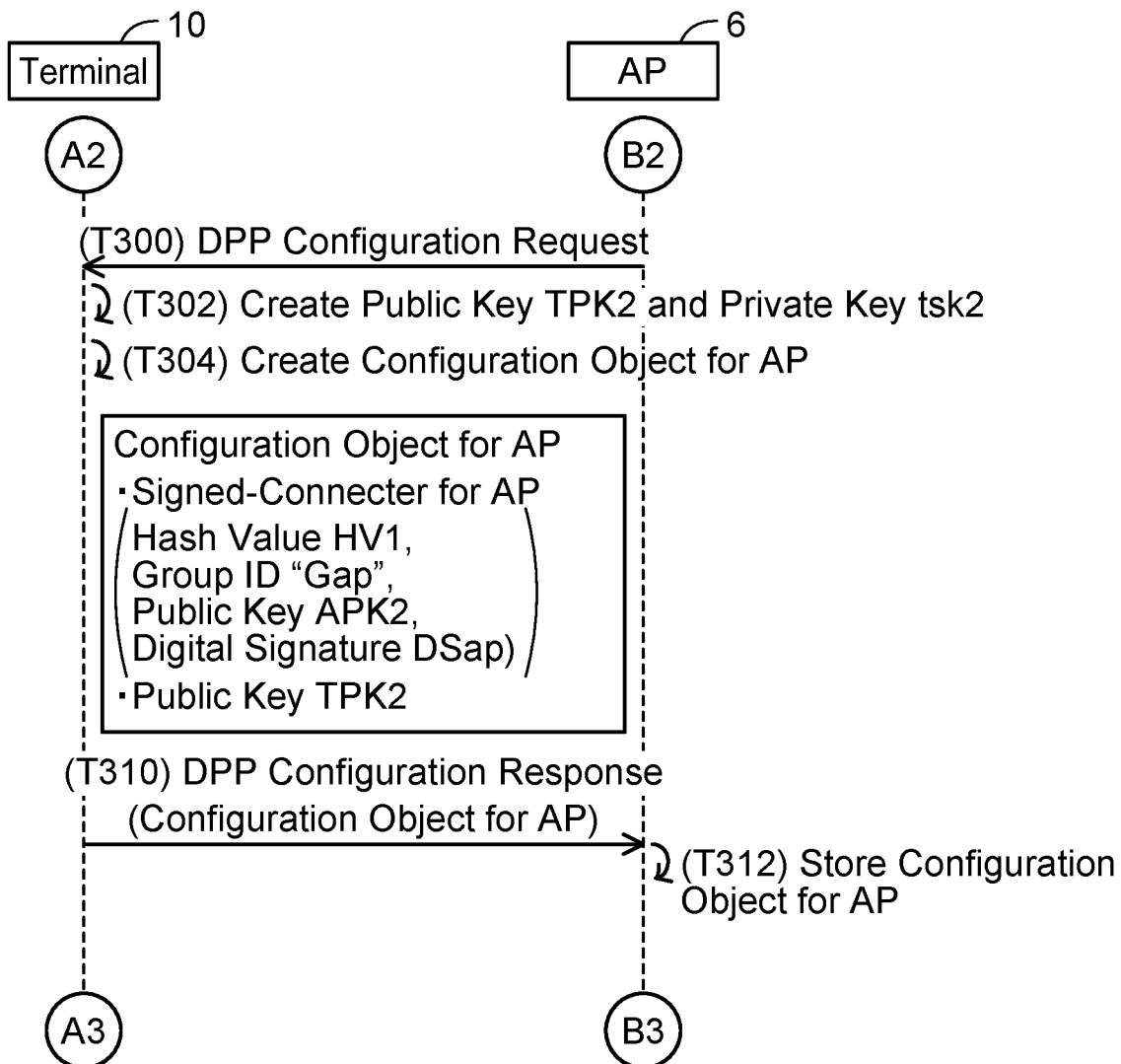
FIG. 9 shows a sequence diagram of a Configuration process with the AP.

Config with AP 6; FIG. 9

Next, the Config process executed between the terminal 10 and the AP 6 in T6 of FIG. 2 will be described with reference to FIG. 9.

In T300, the AP 6 sends a DPP Configuration Request (hereinbelow simply termed "Creq") to the terminal 10. This Creq is a signal requesting a CO for AP to be sent.

In T300, the terminal 10 receives the Creq from the AP 6 via the Wi-Fi I/F 16. In this case, in T302, the terminal 10 creates a new public key TPK2 and a new private key tsk2 of the terminal 10 and stores them in the memory 34. Next, in T304, the terminal 10 creates a CO for AP by using the created private key tsk2. Specifically, the terminal 10 executes the following processes.

First, the terminal 10 creates a hash value HV1 by hashing the public key TPK2 of the terminal 10. Further, the terminal 10 creates a group ID "Gap". The group ID "Gap" is information for identifying a wireless network formed by a normal Wi-Fi connection being established between the terminal 10 and the AP 6. In a variant, a character string designated by the user may be used as the group ID. Further, the terminal 10 creates a first value by hashing a combination of the hash value HV1, the group ID "Gap", and the public key APK2 of the AP 6 in the ARes of T220 in FIG. 8. Then, the terminal 10 creates a digital signature DSap according to ECDSA (Elliptic Curve Digital Signature Algorithm) by encrypting the created first value by using the private key tsk2 of the terminal 10. As a result, the terminal 10 can create a Signed-Connector for AP (hereinbelow, Signed-Connector will be simply termed "SC") including the hash value HV1, the group ID "Gap", the public key APK2 of the AP 6, and the digital signature DSap. Then, the terminal 10 creates a CO for AP including the SC for AP and the public key TPK2 of the terminal 10.

In T310, the terminal 10 sends a DPP Configuration Response (hereinbelow simply termed "CRes") including the CO for AP to the AP 6 via the Wi-Fi I/F 16.

In T310, the AP 6 receives the CRes from the terminal 10. In this case, in T312, the AP 6 stores the CO for AP in this CRes. When the process of T312 completes, the process of FIG. 9 ends.

Figure 10:
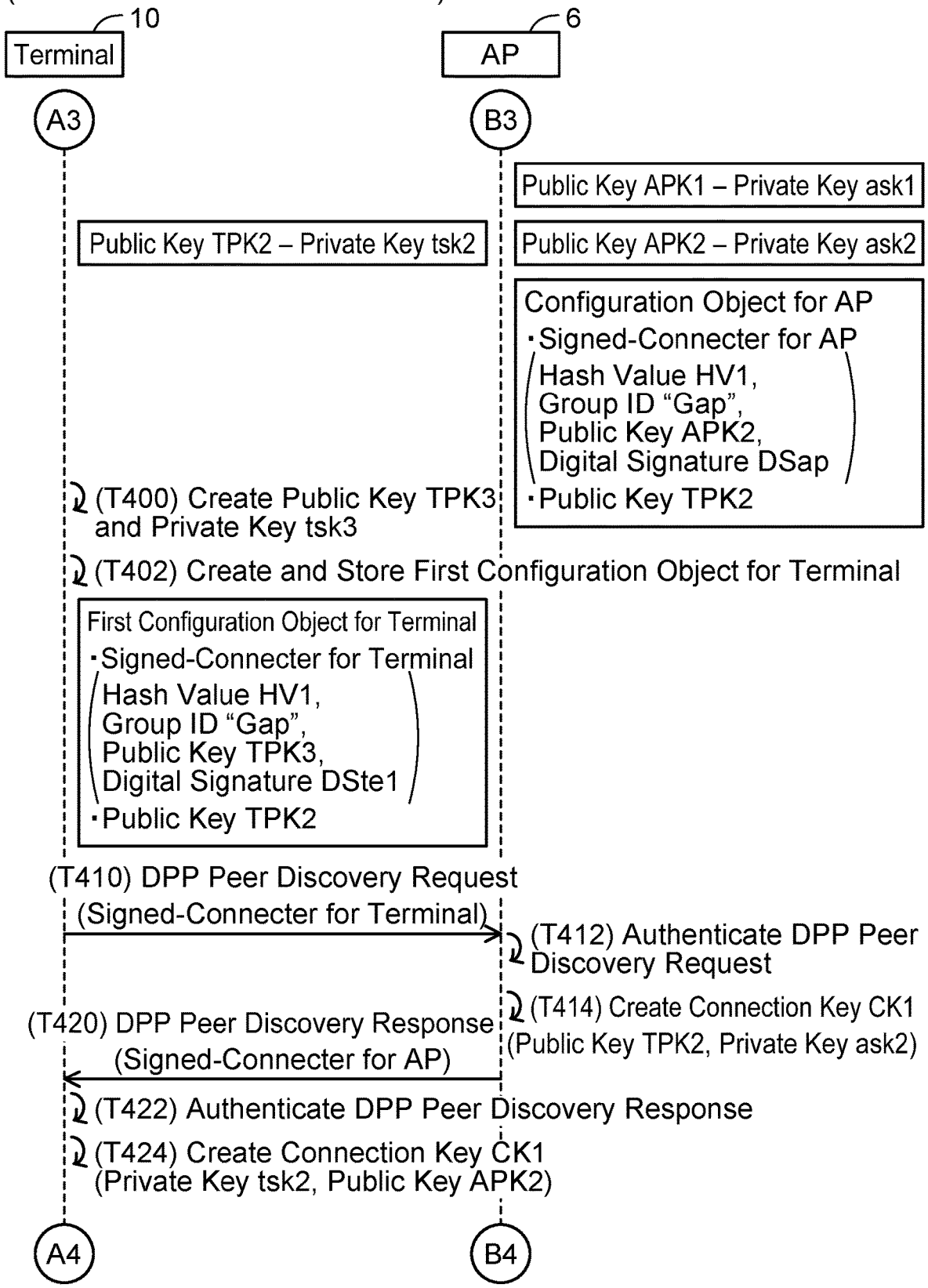
FIG. 10 shows a sequence diagram of a Network Access process with the AP.

NA with AP 6; FIG. 10

Next, the NA process executed between the terminal 10 and the AP 6 in T8 of FIG. 2 will be described with reference to FIG. 10.

In T400, the terminal 10 creates a new public key TPK3 and a private key tsk3 of the terminal 10. Next, in T402, the terminal 10 creates a first CO for terminal by using the private key tsk2 of the terminal 10 stored in the memory 34 in T302 of FIG. 9. Specifically, the terminal 10 executes the following processes.

First, the terminal 10 creates a hash value HV1 by hashing the public key TPK2 of the terminal 10. Further, the terminal 10 creates a second value by hashing a combination of the hash value HV1, a group ID "Gap", and the public key TPK3 of the terminal 10 created in T400. Then, the terminal 10 creates a digital signature DSte1 according to the ECDSA by encrypting the created second value by using the private key tsk2 of the terminal 10. As a result, the terminal 10 can create an SC for terminal including the hash value HV1, the group ID "Gap", the public key TPK3 of the terminal 10, and the digital signature DSte1. The hash value HV1 and the group ID "Gap" included in the SC for terminal are respectively the same as the hash value HV1 and the group ID "Gap" included in the SC for AP. The public key TPK3 and the digital signature DSte1 included in the SC for terminal are respectively different from the public key APK2 and the digital signature DSap included in the SC for AP. Then, the terminal 10 creates a first CO for terminal including the SC for terminal and the public key TPK2 of the terminal 10 stored in the memory 34 in T302 of FIG. 9, and stores it in the memory 34.

In T410, the terminal 10 sends a DPP Peer Discovery Request (hereinbelow simply termed "PDReq") including the SC for terminal to the AP 6 via the Wi-Fi I/F 16. This PDReq is a signal requesting the AP 6 to execute authentication and to send the SC for AP.

In response to receiving the PDReq from the terminal 10 in T410, the AP 6 executes a process for authenticating the sender of the PDReq (i.e., the terminal 10) and the respective information in the PDReq (i.e., the hash value HV1, "Gap", and the public key TPK3). Specifically, in T412, the AP 6 firstly executes a first AP determination process related to whether the hash value HV1 and the group ID "Gap" in the SC for terminal respectively match the hash value HV1 and the group ID "Gap" in the SC for AP. In the case of FIG. 10, the AP 6 determines "matching" in the first AP determination process, thus the AP 6 determines that the authentication for the sender of the PDReq (i.e., the terminal 10) has succeeded. Here, determining "matching" in the first AP determination process means that the SC for terminal and the SC for AP were created by the same device (i.e., the terminal 10). Consequently, the AP 6 also determines that authentication for the creator of the SC for terminal (i.e., the terminal 10) has also succeeded. Further, the AP 6 decrypts the digital signature DSte1 in the SC for terminal by using the public key TPK2 of the terminal 10 included in the CO for AP. In the case of FIG. 10, the decryption of the digital signature DSte1 succeeds, and then the AP 6 executes a second AP determination process related to whether the second value obtained by decrypting the digital signature DSte1 matches a value obtained by hashing the respective information in the SC for terminal (i.e., the hash value HV1, "Gap", and the public key TPK3). In the case of FIG. 10, the AP 6 determines "matching" in the second AP determination process, thus the AP 6 determines that the authentication for the respective information in the PDReq has succeeded and executes processes from T414 onward. Here, determining "matching" in the second AP determination process means that the respective information in the SC for terminal have not been falsified by a third party after the first CO for terminal had been stored in the terminal 10. Authentication using a digital signature, which will be described later, is also a process for confirming that information has not been falsified by a third party. On the other hand, in a case where "not matching" is determined in the first AP determination process, in a case where the decryption of the digital signature DSte1 fails, or in a case where "not matching" is determined in the second AP determination process, the AP 6 determines that the authentication has failed and does not execute the processes from T414 onward.

Next, in T414, the AP 6 creates a connection key (i.e., shared key) CK1 according to the ECDH by using the public key TPK2 of the terminal 10 included in the CO for AP and the private key ask2 of the AP 6.

In T420, the AP 6 sends a DPP Peer Discovery Response (hereinbelow simply termed "PDRes") including the SC for AP to the terminal 10.

In response to receiving the PDRes from the AP 6 via the Wi-Fi I/F 16 in T420, the terminal 10 executes a process for authenticating the sender of the PDRes (i.e., the AP 6) and the respective information (i.e., the hash value HV1, "Gap", and the public key APK2) in the PDRes. Specifically, in T422, the terminal 10 firstly executes a first TE determination process related to whether the hash value HV1 and the group ID "Gap" in the SC for AP respectively match the hash value HV1 and the group ID "Gap" in the SC for terminal. In the case of FIG. 10, the terminal 10 determines "matching" in the first TE determination process, thus the terminal 10 determines that the authentication for the sender of the PDRes (i.e., the AP 6) has succeeded. Here, determining "matching" in the first TE determination process means that the SC for terminal and the SC for AP were created by the same device (i.e., the terminal 10). Consequently, the terminal 10 also determines that authentication for the creator of the SC for terminal (i.e., the terminal 10) has also succeeded. Further, the terminal 10 decrypts the digital signature DSap in the SC for AP by using the public key TPK2 of the terminal 10 included in the first CO for terminal. In the case of FIG. 10, the decryption of the digital signature DSap succeeds, and then the terminal 10 executes a second TE determination process related to whether the first value obtained by decrypting the digital signature DSap matches a value obtained by hashing the respective information in the SC for AP (i.e., the hash value HV1, "Gap", and the public key APK2). In the case of FIG. 10, the terminal 10 determines "matching" in the second TE determination process, thus the terminal 10 determines that the authentication for the respective information in the PDRes has succeeded and executes the processes from T424 onward. On the other hand, in a case where "not matching" is determined in the first TE determination process, in a case where the decryption of the digital signature DSap fails, or in a case where "not matching" is determined in the second TE determination process, the terminal 10 determines that the authentication has failed and does not execute the processes from T424 onward.

In T424, the terminal 10 creates a connection key CK1 according to the ECDH by using the private key tsk2 of the terminal 10 and the public key APK2 of the AP 6 in the SC for AP. Here, the connection key CK1 created by the AP 6 in T414 is the same as the connection key CK1 created by the terminal 10 in T424. Thereby, the connection key CK1 for establishing a Wi-Fi connection is shared between the terminal 10 and the AP 6. When T424 completes, the process of FIG. 10 ends.

As described above, after the connection key CK1 has been shared between the terminal 10 and the AP 6, the terminal 10 and the AP 6 execute the communication of 4way-handshake by using the connection key CK1 in T10 of FIG. 2. As a result, a normal Wi-Fi connection is established between the terminal 10 and the AP 6.

Figure 11:
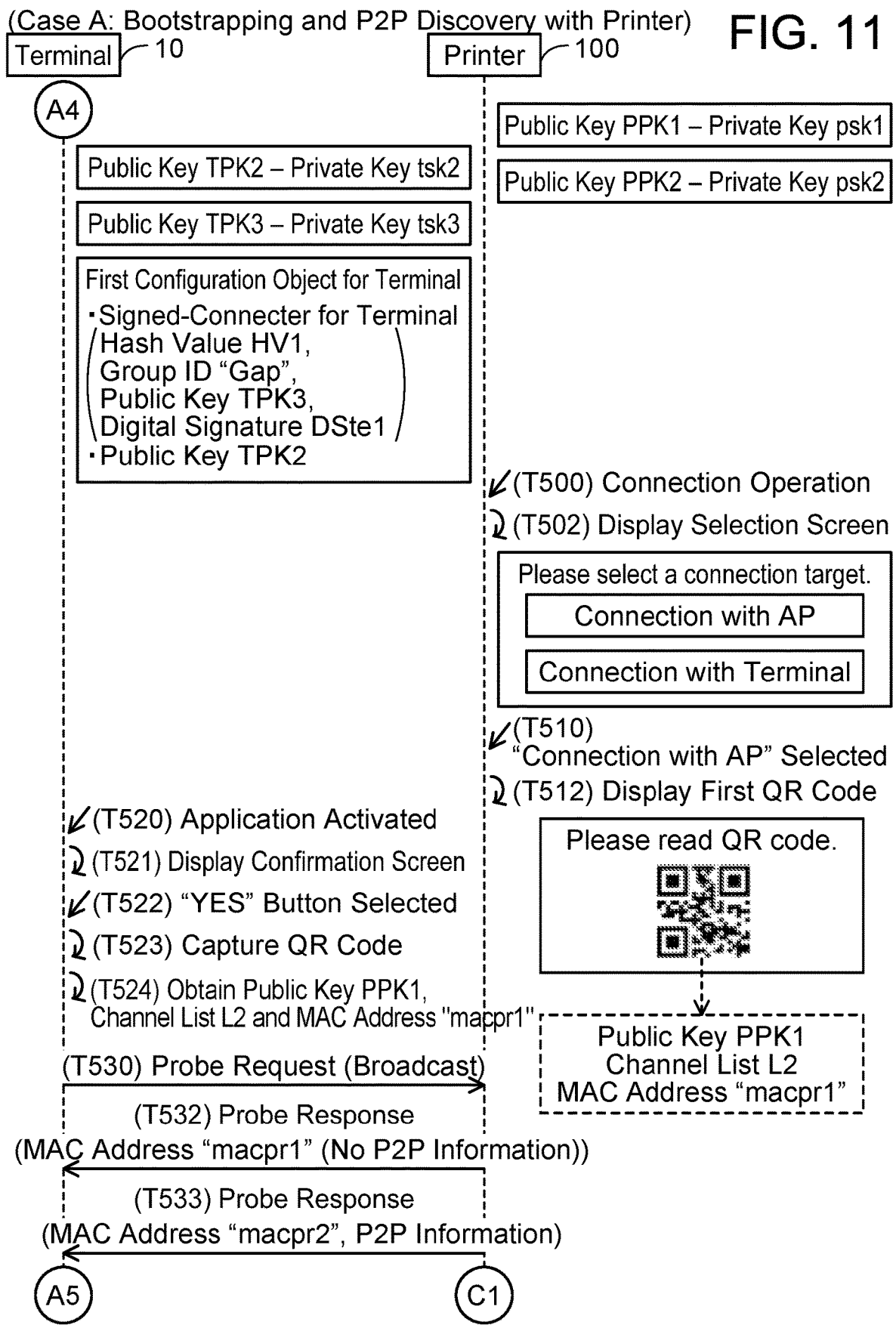
FIG. 11 shows a sequence diagram of Bootstrapping and P2P Discovery processes with the printer.

BS and PDis with Printer 100; FIG. 11

Next, the BS and PDis processes executed between the terminal 10 and the printer 100 in T12 and T13 of FIG. 2 will be described with reference to FIG. 11. In an initial state of FIG. 11, the terminal 10 stores, in the memory 34, the public key TPK2 and the private key tsk2 of the terminal 10 (see T302 of FIG. 9), the public key TPK3 and the private key tsk3 of the terminal 10 (see T400 of FIG. 10), and the first CO for terminal (see T402). Further, the printer 100 stores in advance a public key PPK1, a private key psk1, a public key PPK2 and a private key psk2 of the printer 100. The public key PPK1 and the private key psk1 are a public key and a private key for establishing a normal Wi-Fi connection. The public key PPK2 and the private key psk2 are a public key and a private key for establishing a WFD connection.

In response to a connection operation for causing the printer 100 to establish a wireless connection being executed by the user in T500, the printer 100 displays in T502 a selection screen for selecting a connection target device to which the printer 100 is to connect. The selection screen includes a "Connection with AP" button indicating that the printer 100 is to establish a normal Wi-Fi connection with the AP 6, and a "Connection with terminal" button indicating that the printer 100 is to establish a WFD connection with the terminal 10.

In response to the "Connection with AP" button in the selection screen being selected by the user in T510, the printer 100 displays in T512 a first QR code for establishing a normal Wi-Fi connection. The first QR code is a code image obtained by encoding the public key PPK1 stored in advance in the printer 100, a channel list L2 stored in advance in the printer 100, and the MAC address "macpr1" for establishing a normal Wi-Fi connection. The first QR code may be created by the printer 100 in T512, or may be stored in advance in a memory (not shown) of the printer 100 from the shipping stage of the printer 100.

Figure 7:
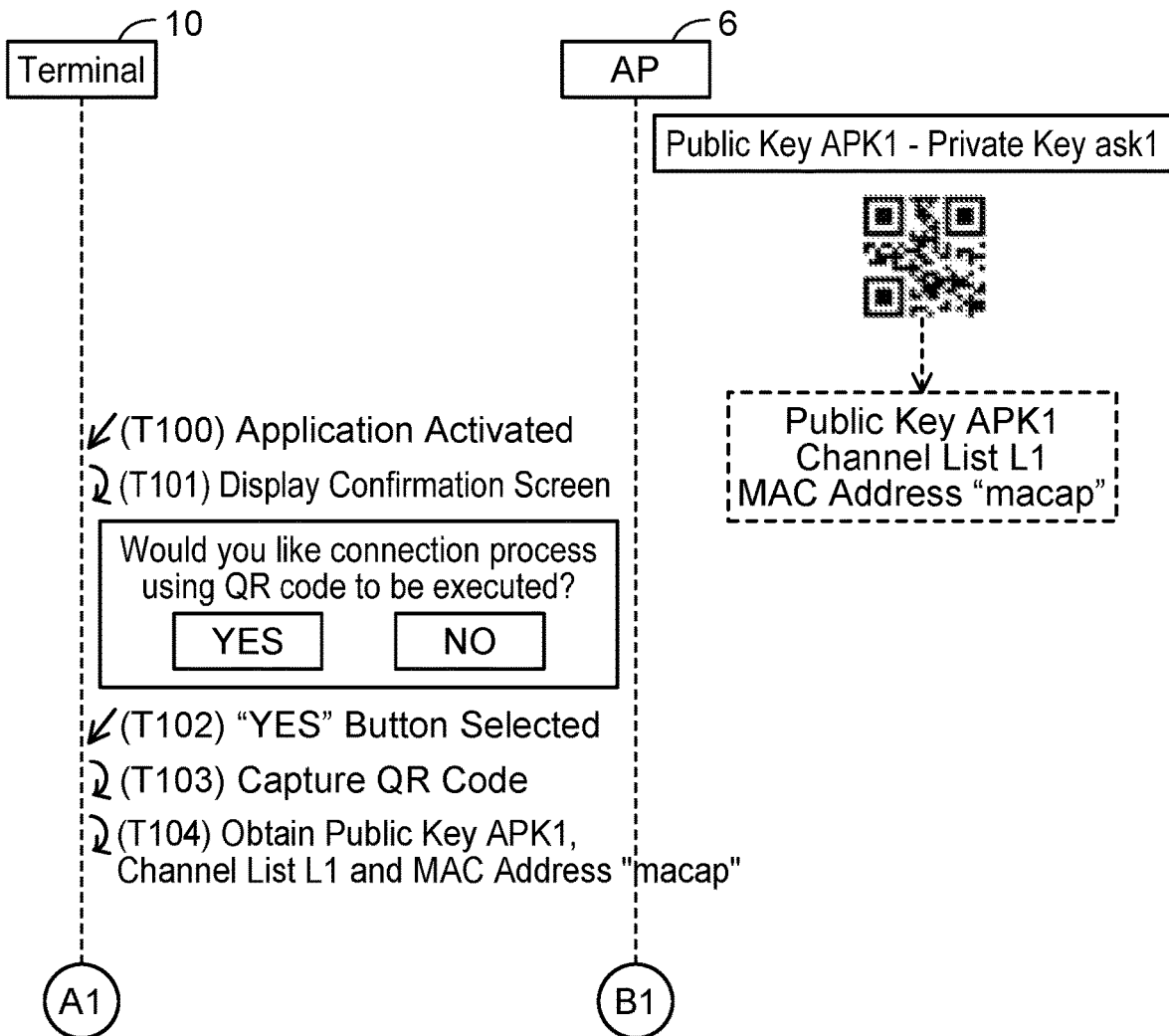
FIG. 7 shows a sequence diagram of a Bootstrapping process with the AP.

T520 to T522 are the same as T100 to T102 of FIG. 7. The terminal 10 uses the camera 15 to capture the first QR code displayed in the printer 100 in T523, and decodes the captured first QR code in T524 to obtain the public key PPK1, the channel list L2, and the MAC address "macpr1" (S5 of FIG. 4). Then, in T530, the terminal 10 sends a PReq by broadcast via the Wi-Fi I/F 16 (S10).

In response to receiving the PReq from the terminal 10 via the Wi-Fi I/F 116 in T530, the printer 100 sends a PRes that includes the MAC address "macpr1" but does not include the P2P information to the terminal 10 in T532, and sends a PRes that includes the MAC address "macpr2" and the P2P information to the terminal 10 in T533.

In T532 and T533, the terminal 10 receives the two PRes from the printer 100 via the Wi-Fi I/F 16. In the present case, in T532, the terminal 10 determines that it has received a PRes including the MAC address "macpr1" that matches the MAC address "macpr1" obtained in T524 (YES in S20 of FIG. 4). Next, the terminal 10 determines that this PRes does not include the P2P information (NO in S25) and determines to execute the normal Wi-Fi process (S30). Then, the printer 100 determines that the first CO for terminal is stored in the memory 34 (YES in S100 of FIG. 3). When the process of T533 completes, the process of FIG. 11 ends.

Figure 12:
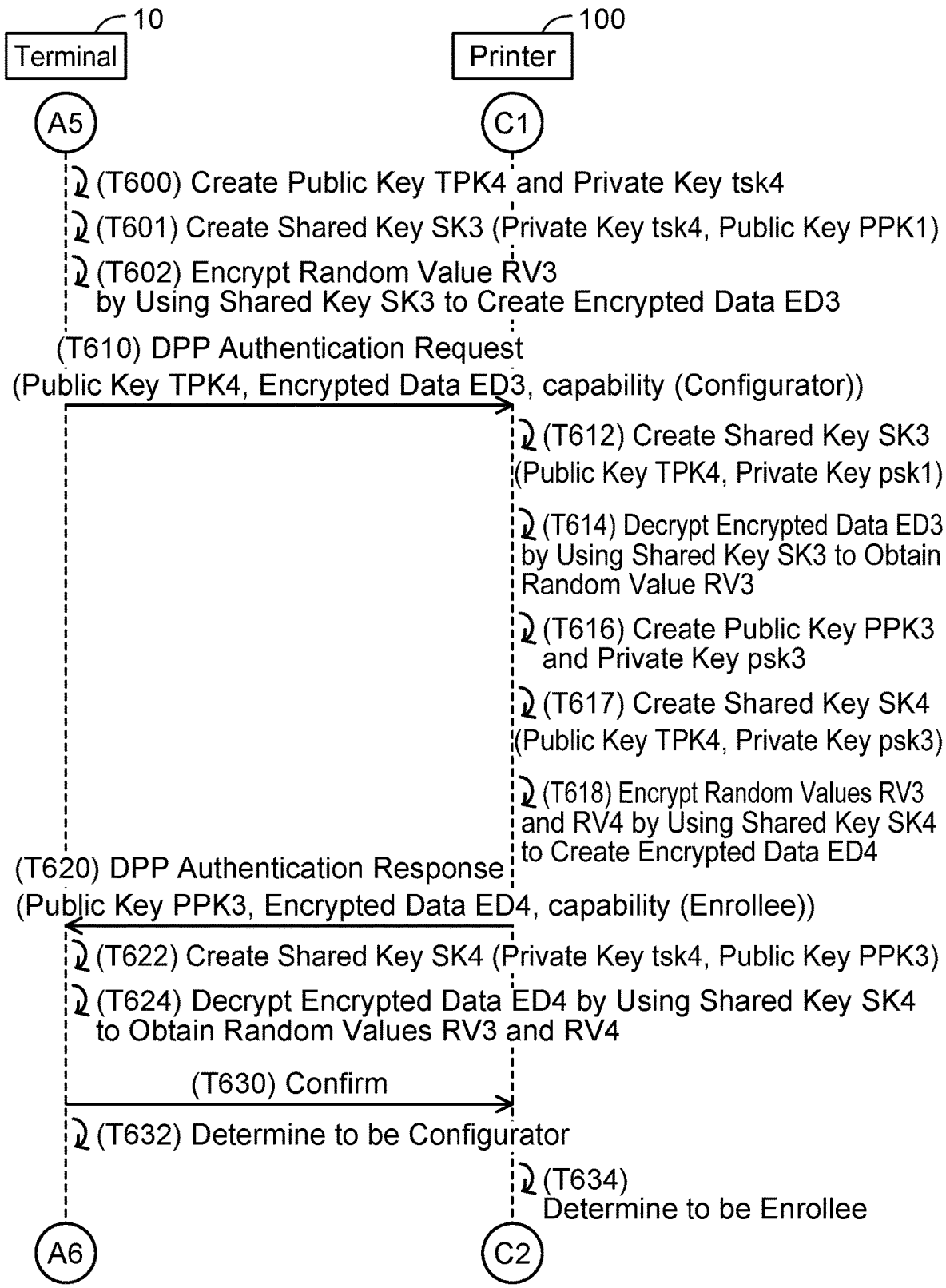
FIG. 12 shows a sequence diagram of an Authentication process with the printer.

Auth with Printer 100; FIG. 12

Next, the Auth process executed between the terminal 10 and the printer 100 in T14 of FIG. 2 will be described with reference to FIG. 12.

The terminal 10 creates a new public key TPK4 and a private key tsk4 of the terminal 10 in T600, and creates in T601 a shared key SK3 according to the ECDH by using the created private key tsk4 and the public key PPK1 of the printer 100 obtained in T524 of FIG. 11. Then, in T602, the terminal 10 encrypts a random value RV3 by using the created shared key SK3 to create encrypted data ED3.

In T610, the terminal 10 sends an AReq to the printer 100 via the Wi-Fi I/F 16, with the MAC address "macpr1" obtained in T524 of FIG. 11 as its destination. Here, the terminal 10 repeatedly sends the AReq to the printer 100 by sequentially using the plurality of communication channels in the channel list L2 obtained in T524. This AReq includes the public key TPK4 of the terminal 10 created in T600, the encrypted data ED3 created in T602, and the capability of the terminal 10. This capability includes the value indicating that the terminal 10 is capable of operating only as the Configurator.

In T610, the printer 100 receives the AReq from the terminal 10 via the Wi-Fi I/F 116. Since this AReq is sent with the MAC address "macpr1" of the printer 100 as the destination, the printer 100 can appropriately receive the AReq. Further, since the AReq is sent by sequentially using the plurality of communication channels in the channel list L2 (i.e., the plurality of communication channels that the printer 100 can use), the printer 100 can appropriately receive the AReq.

Next, the printer 100 executes processes of T612 and T614 for authenticating the sender of the AReq (i.e., the terminal 10). T612 and T614 are the same as T212 and T214 of FIG. 8 except that different data is used (keys, encrypted data, etc. are different). That is, the printer 100 creates the shared key SK3 by using the public key TPK4 and the private key psk1 in T612, and decrypts the encrypted data ED3 in the AReq by using the shared key SK3 in T614. In this case, the printer 100 determines that the authentication has succeeded and executes processes from T616 onward.

In T616, the printer 100 creates a new public key PPK3 and a new private key psk3 of the printer 100. In a variant, the printer 100 may store the public key PPK3 and the private key psk3 in advance. T617 and T618, which are executed subsequently, are the same as T217 and T218 of FIG. 8 except that different data is used (keys, encrypted data, etc. are different). That is, the printer 100 creates a shared key SK4 by using the public key TPK4 and the private key psk3 in T617, and encrypts the random value RV3 and a random value RV4 in T618 by using the shared key SK4 to create encrypted data ED4.

In T620, the printer 100 sends an ARes to the terminal 10 via the Wi-Fi I/F 116. This ARes includes the public key PPK3 of the printer 100 created in T616, the encrypted data ED4 created in T618, and the capability of the printer 100. This capability includes the value indicating that the printer 100 is capable of operating only as the Enrollee.

T622 to T634 are the same as T222 to T234 of FIG. 8 except for that the communication target is the printer 100 and that the public key PPK3, the encrypted data ED4, the private key tsk4, the shared key SK4, and the random values RV3, RV4 are used by the terminal 10. As a result, the terminal 10 determines to operate as the Configurator in T632, and the printer 100 determines to operate as the Enrollee in T634. When the process of T634 completes, the process of FIG. 11 ends. When the process of FIG. 8 ends, the terminal 10 discards the public key TPK4 and the private key tsk4 (i.e., deletes them from the memory 34).

Figure 13:
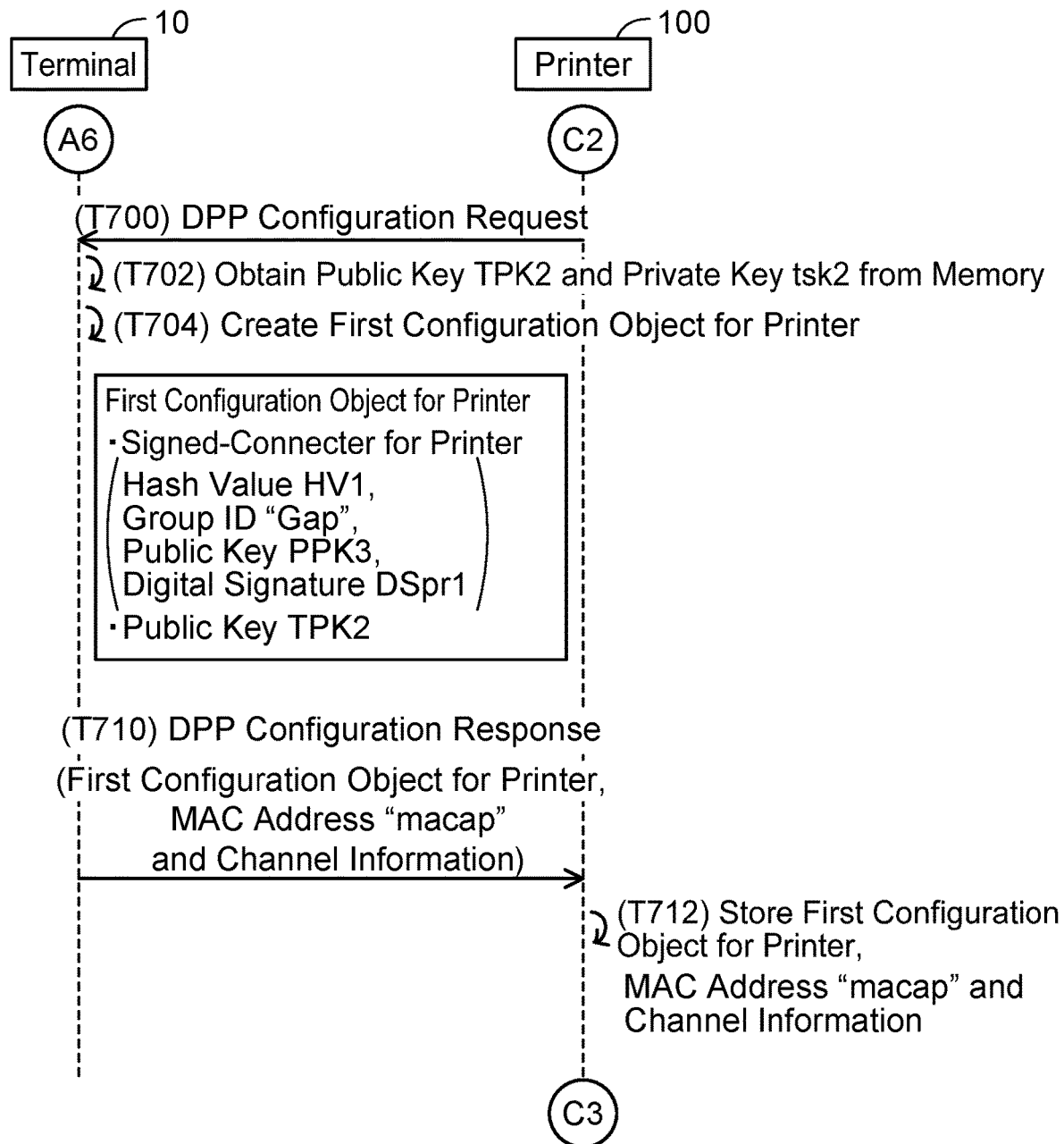
FIG. 13 shows a sequence diagram of a Configuration process with the printer.

Config with Printer 100; FIG. 13

Next, the Config process executed between the terminal 10 and the printer 100 in T16 of FIG. 2 will be described with reference to FIG. 13.

In T700, the printer 100 sends a Creq to the terminal 10 via the Wi-Fi I/F 116. This Creq is a signal requesting a CO for printer to be sent.

In T700, the terminal 10 receives the Creq from the printer 100 via the Wi-Fi I/F 16. In this case, in T702, the terminal 10 obtains the public key TPK2 and the private key tsk2 of the terminal 10 from the memory 34. Specifically, the terminal 10 obtains the first CO for terminal from the memory 34 to obtain the public key TPK2 included in the first CO for terminal. Then, the terminal 10 obtains, from the memory 34, the private key tsk2 corresponding to the obtained public key TPK2.

In T704, the terminal 10 creates a first CO for printer. T704 is the same as T304 of FIG. 9 except for that different data is used (keys, etc. are different). The first CO for printer includes an SC for printer and the public key TPK2 obtained in T702. The SC for printer includes the hash value HV1, the group ID "Gap", the public key PPK3 of the printer 100, and a digital signature DSPpr1. The digital signature DSPpr1 is information in which a third value, which is obtained by hashing a combination of the hash value HV1, the group ID "Gap", and the public key PPK3, is encrypted by the private key tsk2 obtained in T702.

In a case of establishing a normal Wi-Fi connection with the AP 6 in T10 of FIG. 2, the terminal 10 stores, in the memory 34, the MAC address "macap" of the AP 6 obtained in T104 of FIG. 7 and channel information indicating a communication channel used in the Wi-Fi connection with the AP 6. In T710, the terminal 10 sends, to the printer 100 via the Wi-Fi I/F 16, a CRes including the first CO for printer created in T704, the stored MAC address "macap" of the AP 6, and the stored channel information.

In T710, the printer 100 receives the CRes from the terminal 10 via the Wi-Fi I/F 116. In this case, in T712, the printer 100 stores the first CO for printer, the MAC address "macap", and the channel information in this CRes. When the process of T712 completes, the process of FIG. 13 ends.

Figure 14:
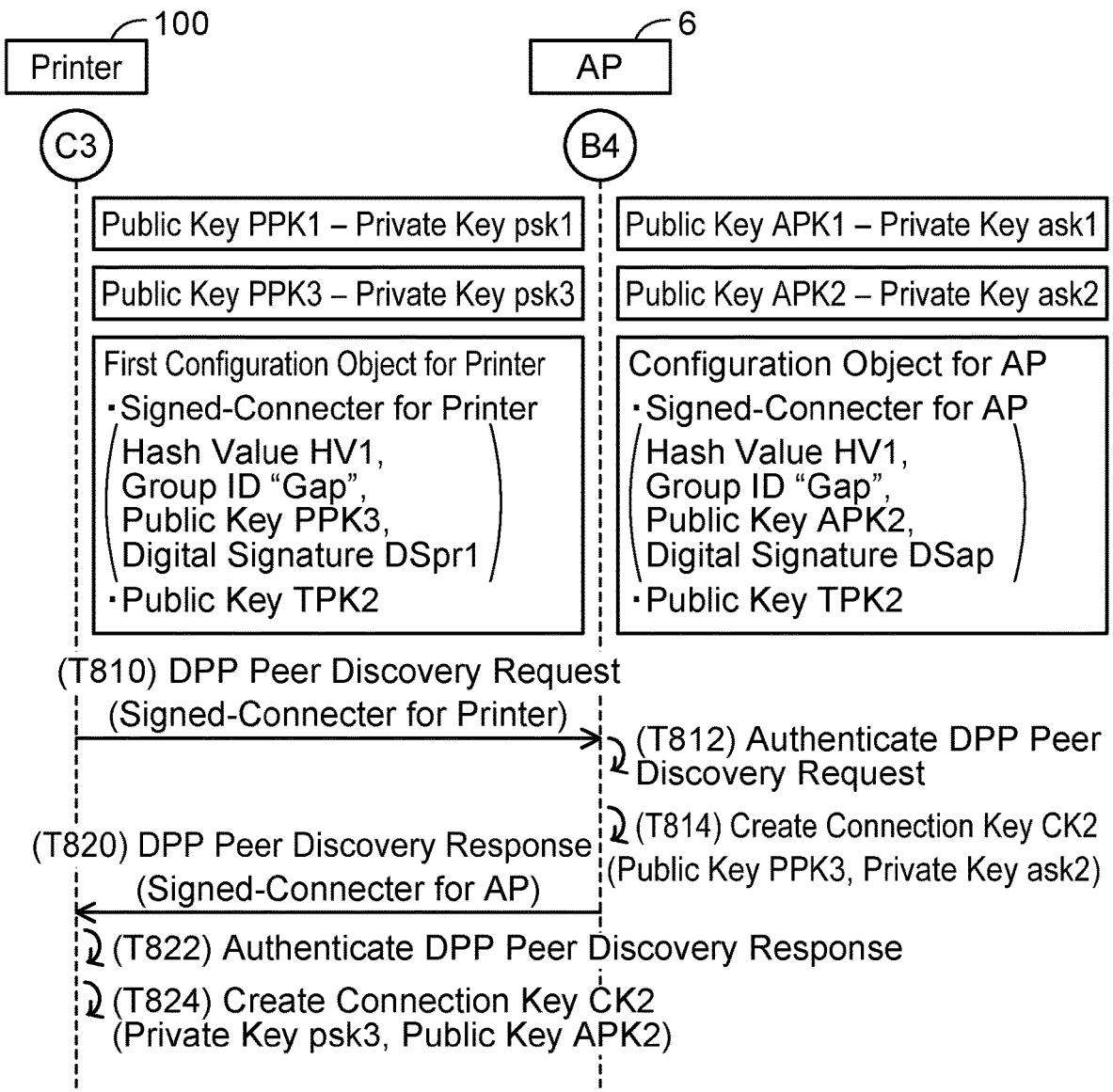
FIG. 14 shows a sequence diagram of a Network Access process between the printer and the AP.

NA Between Printer 100 and AP 6; FIG. 14

Next, the NA process in T18 of FIG. 2 executed between the printer 100 and the AP 6 will be described with reference to FIG. 14. In an initial state of FIG. 14, the printer 100 stores the public keys PPK1, PPK3, the private keys psk1, psk3, and the first CO for printer. Further, the AP 6 stores the public keys APK1, APK2, the private keys ask1, ask2, and the CO for AP.

In T810, the printer 100 uses the communication channel indicated by the channel information stored in T712 to send a PDReq including the SC for printer to the AP 6 via the Wi-Fi I/F 116, with the MAC address "macap" of the AP 6 stored in T712 of FIG. 13 as its destination.

In T810, the AP 6 receives the PDReq from the printer 100. As described above, since the PDReq is sent with the MAC address "macap" of the AP 6 as the destination, the AP 6 can appropriately receive the PDReq from the printer 100. Further, since the PDReq is sent by using the particular communication channel indicated by the channel information, the AP 6 can appropriately receive the PDReq from the printer 100.

In response to receiving the PDReq from the printer 100 in T810, the AP 6 executes a process of T812 for authenticating the sender of the PDReq (i.e., the printer 100) and the respective information in the PDReq (i.e., the hash value HV1, "Gap", and the public key PPK3). T812 is the same as T412 of FIG. 10 except for that different data is used (keys, etc. are different). That is, the AP 6 determines that the hash value HV1 and the group ID "Gap" in the SC for printer respectively match the hash value HV1 and the group ID "Gap" in the SC for AP (i.e., determines that the authentication for the sender of the PDReq (i.e., the printer 100) has succeeded). Further, the AP 6 decrypts the digital signature DSPpr1 in the SC for printer by using the public key TPK2 of the terminal 10 included in the CO for AP, and determines that the third value obtained by the decryption matches a value obtained by hashing the respective information in the SC for printer (i.e., the hash value HV1, "Gap", and the public key PPK3) (i.e., determines that the authentication for the respective information in the PDReq has succeeded).

T814 and T820 are the same as T414 and T420 of FIG. 10 except for that the communication target is the printer 100 and that the public key PPK3 of the printer 100 and a connection key CK2 are used. In response to receiving the PDRes from the AP 6 via the Wi-Fi I/F 116 in T820, the printer 100 executes a process of T822 for authenticating the sender of the PDRes (i.e., the AP 6) and the respective information in the PDRes (i.e., the hash value HV1, "Gap", and the public key APK2). T822 is the same as T422 of FIG. 10 except for that the subject of action is the printer 100 and that different data is used (keys, etc. are different). That is, the printer 100 determines that the hash value HV1 and the group ID "Gap" in the SC for AP respectively match the hash value HV1 and the group ID "Gap" in the SC for printer (i.e., determines that the authentication for the sender of the PDRes (i.e., the AP 6) has succeeded). Further, the printer 100 decrypts the digital signature DSap in the SC for AP by using the public key TPK2 of the terminal 10 included in the first CO for printer and determines that the first value obtained by the decryption matches a value obtained by hashing the respective information in the SC for AP (i.e., the hash value HV1, "Gap", and the public key APK2) (i.e., determines that the authentication for the respective information in the PDRes has succeeded).

In T824, the printer 100 creates a connection key CK2 according to the ECDH by using the private key psk3 of the printer 100 and the public key APK2 of the AP 6 in the SC for AP. Here, the connection key CK2 created by the AP 6 in T814 is the same as the connection key CK2 created by the printer 100 in T824. Thereby, the connection key CK2 for establishing a normal Wi-Fi connection is shared between the printer 100 and the AP 6. When T824 completes, the process of FIG. 14 ends.

As described above, after the connection key CK2 has been shared between the printer 100 and the AP 6, the printer 100 and the AP 6 execute the communication of 4way-handshake in T20 of FIG. 2 by using the connection key CK2. As a result, a normal Wi-Fi connection is established between the printer 100 and the AP 6, thus the processes of T30 to T48 of FIG. 2 can be executed.

Processes of Case B; FIG. 15 to FIG. 18

Next, details of the processes executed in T52 to T58 of case B in FIG. 3 will be described with reference to FIG. 15 to FIG. 18. First, the BS, PDis, and G/O Nego processes executed between the terminal 10 and the printer 100 in T52 to T54 of FIG. 3 will be described with reference to FIG. 15. In an initial state of FIG. 15, the printer 100 stores, in advance, the public key PPK1, the private key psk1, the public key PPK2 and the private key psk2 of the printer 100.

T900 and T902 are the same as T500 and T502 of FIG. 11. In response to the "Connection with terminal" button in the selection screen being selected by the user in T910, the printer 100 displays in T912 a second QR code for establishing a WFD connection. The second QR code is a code image obtained by encoding the public key PPK2 stored in advance in the printer 100, the channel list L2 stored in advance in the printer 100, and the MAC address "macpr2" for establishing a WFD connection. The second QR code may be created by the printer 100 in T912, or may be stored in advance in the memory (not shown) of the printer 100 from the shipping stage of the printer 100.

T920 to T922 are the same as T100 to T102 of FIG. 7. The terminal 10 uses the camera 15 in T923 to capture the second QR code displayed in the printer 100, and decodes the captured second QR code in T924 to obtain the public key PPK2, the channel list L2, and the MAC address "macpr2" (S5 of FIG. 4). T930 to T933 are the same as T530 to T533 of FIG. 11.

In the present case, in T933, the terminal 10 determines that it has received a PRes including the MAC address "macpr2" that matches the MAC address "macpr2" obtained in T924 (YES in S20 of FIG. 4). Next, the terminal 10 determines that this PRes includes the P2P information (YES in S25) and determines to execute the WFD process (S35).

Next, the terminal 10 executes the G/O Nego with the printer 100. Specifically, the terminal 10 sends a G/O Negotiation Request requesting execution of the G/O Nego to the printer 100 via the Wi-Fi I/F 16 in T940, and receives a G/O Negotiation Response from the printer 100 in T942. As a result of the G/O Nego, it is determined that the terminal 10 is to operate as a client and the printer 100 is to operate as a G/O, the terminal 10 transits to a client state in T944, and the printer 100 transits to a G/O state in T946. When the process of T946 completes, the process of FIG. 15 ends.

Figure 16:
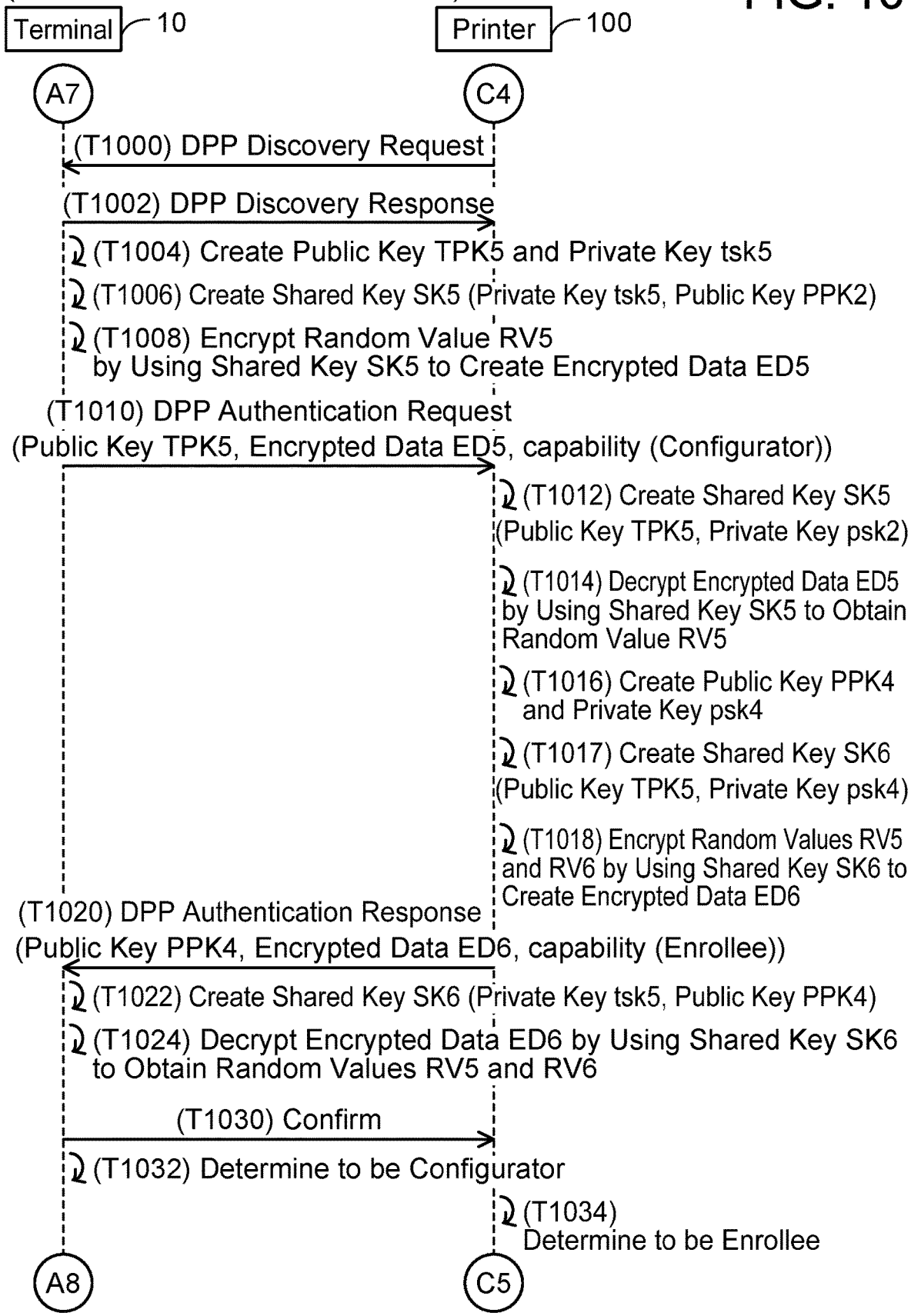
FIG. 16 shows a sequence diagram of an Authentication process with the printer.

Auth with Printer 100; FIG. 16

Next, the Auth process executed between the terminal 10 and the printer 100 in T55 of FIG. 3 will be described with reference to FIG. 16.

In T1000, the printer 100 sends a DPP Discovery Request (hereinbelow simply termed "DReq") to the terminal 10 via the Wi-Fi I/F 116. The DReq is a signal for searching for the terminal 10, and is a signal sent from a device operating as a G/O to a device operating as a client.

In a case of receiving the DReq from the printer 100 via the Wi-Fi I/F 16 in T1000, the terminal 10 sends a DPP Discovery Response (hereinbelow simply termed "DRes"), which is a response to the DReq, to the printer 100 in T1002.

Figure 15:
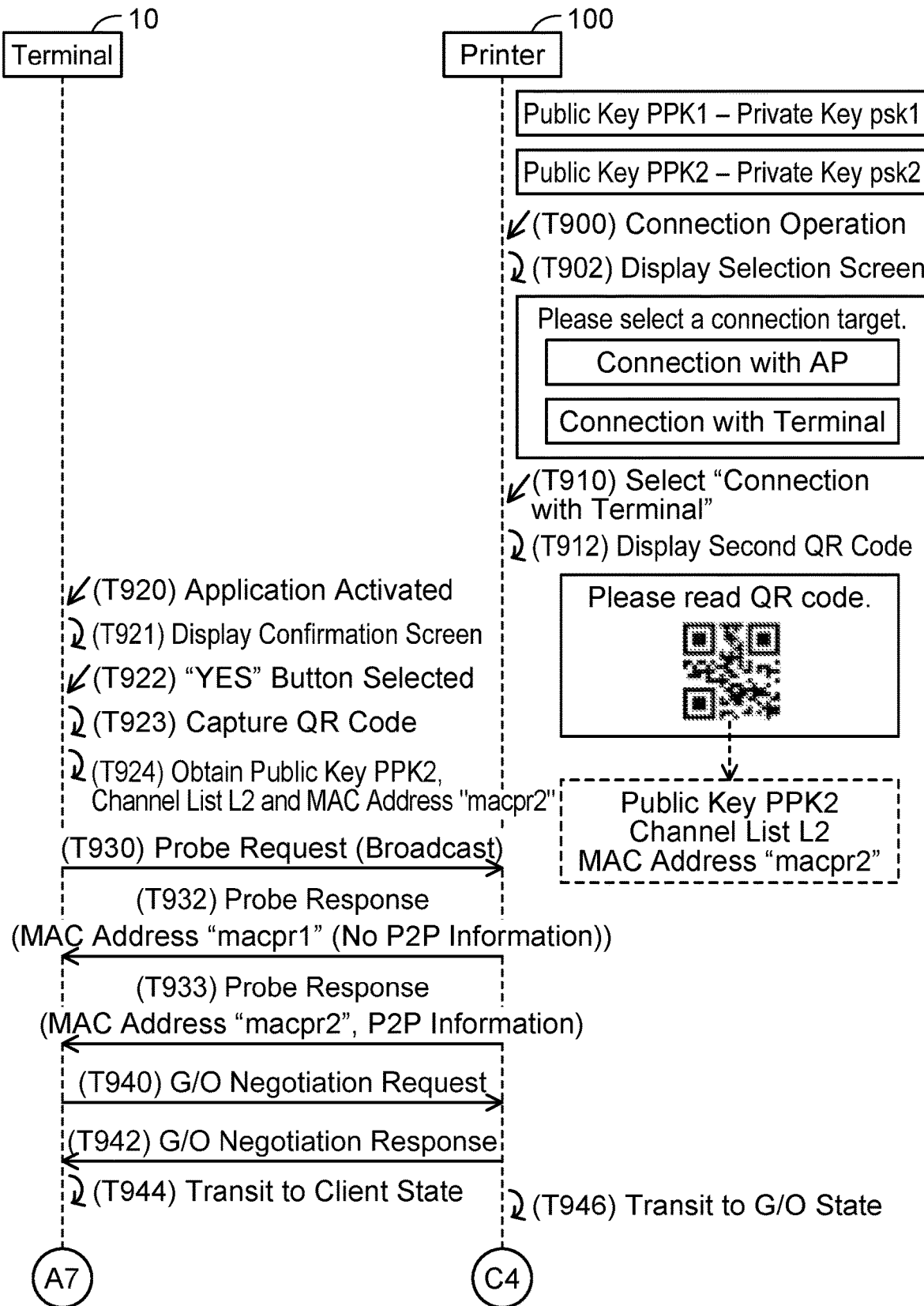
FIG. 15 shows a sequence diagram of Bootstrapping, P2P Discovery, and G/O Negotiation processes with the printer.

Next, the terminal 10 creates a new public key TPK5 and a private key tsk5 of the terminal 10 in T1004, and creates in T1006 a shared key SK5 according to the ECDH by using the created private key tsk5 and the public key PPK2 of the printer 100 obtained in T924 of FIG. 15. Then, in T1008, the terminal 10 encrypts a random value RV5 by using the created shared key SK5 to create encrypted data ED5.

In T1010, the terminal 10 sends an AReq to the printer 100 via the Wi-Fi I/F 16 with the MAC address "macpr2" obtained in T924 of FIG. 15 as its destination. Further, the terminal 10 repeatedly sends the AReq to the printer 100 by sequentially using the plurality of communication channels in the channel list L2 obtained in T924. This AReq includes the public key TPK5 of the terminal 10 created in T1004, the encrypted data ED5 created in T1008, and the capability of the terminal 10. This capability includes the value indicating that the terminal 10 is capable of operating only as the Configurator.

In T1010, the printer 100 receives the AReq from the terminal 10 via the Wi-Fi I/F 116. Since this AReq is sent with the MAC address "macpr2" of the printer 100 as the destination, the printer 100 can appropriately receive this AReq.

Next, the printer 100 executes processes of T1012 and T1014 for authenticating the sender of the AReq (i.e., the terminal 10). T1012 and T1014 are the same as T212 and T214 of FIG. 8 except for that different data is used (keys, encrypted data, etc. are different). That is, the printer 100 creates the shared key SK5 by using the public key TPK5 and the private key psk2 in T1012, and decrypts the encrypted data ED5 in the AReq by using the shared key SK5 in T1014. In this case, the printer 100 determines that the authentication has succeeded and executes processes from T1016 onward.

In T1016, the printer 100 creates a new public key PPK4 and a new private key psk4 of the printer 100. In a variant, the printer 100 may store the public key PPK4 and the private key psk4 in advance. T1017 and T1018, which are executed subsequently, are the same as T217 and T218 of FIG. 8 except for that different data is used (keys, encrypted data, etc. are different). That is, the printer 100 creates a shared key SK6 by using the public key TPK5 and the private key psk4 in T1017, and encrypts the random value RV5 and a random value RV6 in T1018 by using the shared key SK6 to create encrypted data ED6.

In T1020, the printer 100 sends an ARes to the terminal 10 via the Wi-Fi I/F 116. This ARes includes the public key PPK4 of the printer 100 created in T1016, the encrypted data ED6 created in T1018, and the capability of the printer 100. This capability includes the value indicating that the printer 100 is capable of operating only as the Enrollee.

T1022 to T1034 are the same as T222 to T234 of FIG. 8 except for that the communication target is the printer 100 and that the public key PPK4, the encrypted data ED6, the private key tsk5, the shared key SK6, and the random values RV5, RV6 are used by the terminal 10. As a result, the terminal 10 determines to operate as a Configurator in T1032, and the printer 100 determines to operate as an Enrollee in T1034. When the process of T1034 completes, the process of FIG. 16 ends. When the process of FIG. 16 ends, the terminal 10 discards the public key TPK5 and the private key tsk5 (i.e., deletes them from the memory 34).

Figure 17:
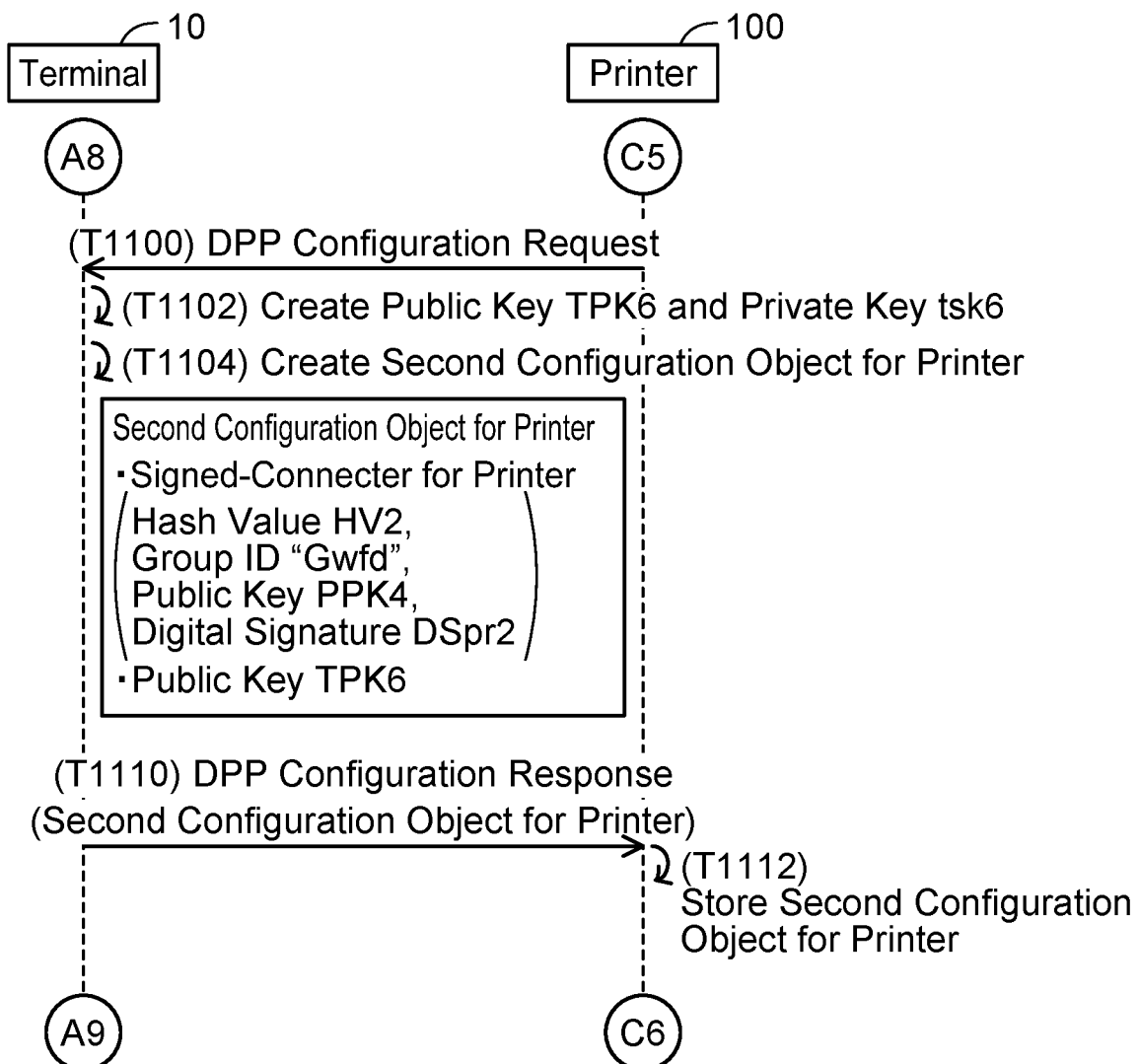
FIG. 17 shows a sequence diagram of a Configuration process with the printer.

Config with Printer 100; FIG. 17

Next, the Config process executed between the terminal 10 and the printer 100 in T56 of FIG. 3 will be described with reference to FIG. 17.

T1100 is the same as T700 of FIG. 13. In T1102, the terminal 10 creates a new public key TPK6 and a private key tsk6 of the terminal 10.

In T1104, the terminal 10 creates a second CO for printer. T1104 is the same as T304 of FIG. 9 except for that different data is used (keys, etc. are different). The second CO for printer includes an SC for printer and the public key TPK6 created in T1102. This SC for printer includes a hash value HV2, a group ID "Gwfd", the public key PPK4 of the printer 100, and a digital signature DSPpr2. The hash value HV2 is a value obtained by hashing the public key TPK6 of the terminal 10. The group ID "Gwfd" is information for identifying a wireless network formed by establishing a WFD connection between the terminal 10 and the printer 100. The digital signature DSPpr2 is information in which a fourth value, which is obtained by hashing a combination of the hash value HV2, the group ID "Gwfd", and the public key PPK4, is encrypted by the private key tsk6 created in T1102.

In T1110, the terminal 10 sends a CRes including the second CO for printer created in T1104 to the printer 100 via the Wi-Fi I/F 16.

In T1110, the printer 100 receives the CRes from the terminal 10 via the Wi-Fi I/F 116. In this case, in T1112, the printer 100 stores the second CO for printer in this CRes. When the process of T1112 completes, the process of FIG. 17 ends.

Figure 18:
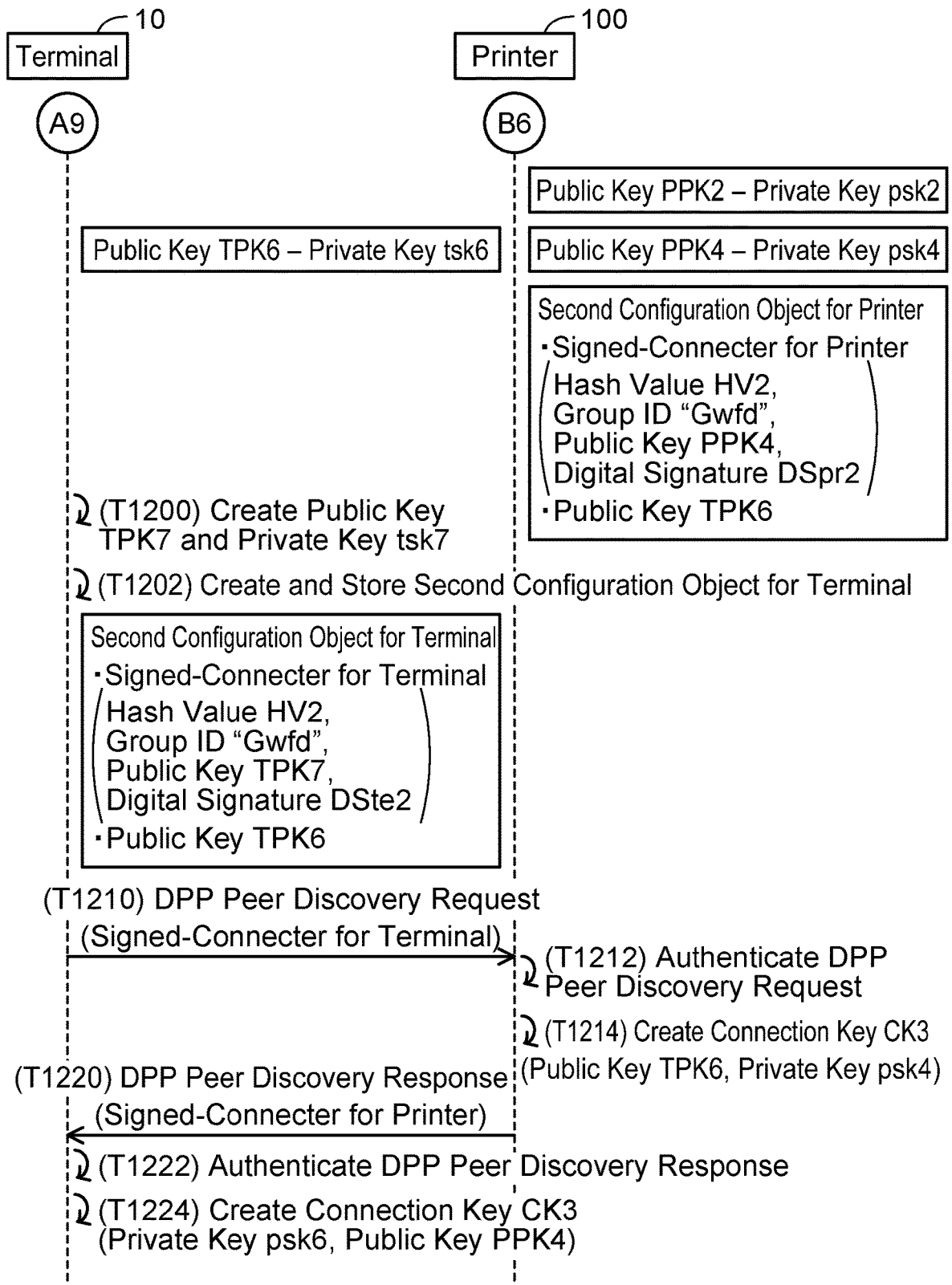
FIG. 18 shows a sequence diagram of a Network Access process with the printer.

NA with Printer 100; FIG. 18

Next, the NA process executed between the terminal 10 and the printer 100 in T58 of FIG. 3 will be described with reference to FIG. 18. In an initial state of FIG. 18, the terminal 10 stores the public key TPK6 and the private key tsk6 in the memory 34. Further, the printer 100 stores the public keys PPK2, PPK4, the private keys psk2, psk4, and the second CO for printer.

In T1200, the terminal 10 creates a new public key TPK7 and a private key tsk7 of the terminal 10. Next, in T1202, the terminal 10 creates a second CO for terminal by using the private key tsk6 of the terminal 10 stored in the memory 34 in T1102 of FIG. 17. T1202 is the same as T402 of FIG. 10 except for that different data is used (keys, etc. are different). The second CO for terminal includes an SC for terminal and the public key TPK6 created in T1102. This SC for terminal includes the hash value HV2, the group ID "Gwfd", the public key TPK7 of the terminal 10, and a digital signature DSte2. The digital signature DSte2 is information in which a fifth value, which is obtained by hashing a combination of the hash value HV2, the group ID "Gwfd", and the public key TPK7, is encrypted by the private key tsk6 created in T1102.

In T1210, the terminal 10 sends a PDReq including the SC for terminal to the printer 100 via the Wi-Fi I/F 16.

In response to receiving the PDReq from the terminal 10 in T1210, the printer 100 executes a process of T1212 for authenticating the sender of the PDReq (i.e., the terminal 10) and the respective information in the PDReq (i.e., the hash value HV2, "Gwfd", and the public key TPK7). T1212 is the same as T412 of FIG. 10 except for that different data is used (keys, etc. are different). That is, the printer 100 determines that the hash value HV2 and the group ID "Gwfd" in the SC for terminal respectively match the hash value HV2 and the group ID "Gwfd" in the SC for printer (i.e., determines that the authentication for the sender of the PDReq (i.e., the terminal 10) has succeeded). Further, the printer 100 decrypts the digital signature DSte2 in the SC for terminal by using the public key TPK6 of the terminal 10 included in the second CO for printer, and determines that the fifth value obtained by the decryption matches a value obtained by hashing the respective information in the SC for terminal (i.e., the hash value HV2, "Gwfd", and the public key TPK7) (i.e., determines that the authentication for the respective information in the PDReq has succeeded).

T1214 and T1220 are the same as T414 and T420 of FIG. 10 except for that the communication target is the printer 100 and that the public key TPK6 of the terminal 10, the private key psk4 of the printer 100, and a connection key CK3 are used. In response to receiving the PDRes from the printer 100 via the Wi-Fi I/F 16 in T1220, the terminal 10 executes a process of T1222 for authenticating the sender of the PDRes (i.e., the printer 100) and the respective information in the PDRes (i.e., the hash value HV2, "Gwfd", and the public key PPK4). T1222 is the same as T422 of FIG. 10 except for that different data is used (keys, etc. are different). That is, the terminal 10 determines that the hash value HV2 and the group ID "Gwfd" in the SC for printer respectively match the hash value HV2 and the group ID "Gwfd" in the SC for terminal (i.e., determines that the authentication for the sender of the PDRes (i.e., the printer 100) has succeeded). Further, the terminal 10 decrypts the digital signature DSPpr2 in the SC for printer by using the public key TPK6 of the terminal 10 included in the second CO for terminal, and determines that the fourth value obtained by the decryption matches a value obtained by hashing the respective information in the SC for printer (i.e., the hash value HV2, "Gwfd", and the public key PPK4) (i.e., determines that the authentication for the respective information in the PDRes has succeeded).

In T1224, the terminal 10 creates a connection key CK3 according to the ECDH by using the private key tsk6 of the terminal 10 and the public key PPK4 of the printer 100 in the SC for printer. Here, the connection key CK3 created by the printer 100 in T1214 is the same as the connection key CK3 created by the terminal 10 in T1224. Thereby, the connection key CK3 for establishing a WFD connection is shared between the terminal 10 and the printer 100. When T1224 completes, the process of FIG. 18 ends.

As described above, after the connection key CK3 has been shared between the terminal 10 and the printer 100, the terminal 10 and the printer 100 establish a WFD connection in T60 of FIG. 3 by using the connection key CK3. As a result, the processes of T70 to T84 of FIG. 3 are executed.

As described in the case A and case B above, the terminal 10 obtains, from the printer 100, the public key PPK1 (or PPK2) and the MAC address "macpr1" (or "macpr2") of the printer 100 (T524 of FIG. 11 or T924 of FIG. 15), sends a PReq by broadcast (T530 or T930), and receives a PRes including the MAC address "macpr1" (or "macpr2") from the printer 100 (T532 and T533, or T932 and T933). Further, the terminal 10 sends to the printer 100 an AReq in which the public key PPK1 (or PPK2) is used (T610 of FIG. 12 or T1010 of FIG. 16), and receives an ARes from the printer 100 (T620 or T1020). In a case where the PRes including the obtained MAC address "macpr1" does not include the P2P information (T532), the terminal 10 determines that the printer 100 is to establish a normal Wi-Fi connection with the AP 6, and sends, to the printer 100, the first CO for printer for the printer 100 to establish a normal Wi-Fi connection with the AP 6 (T710 of FIG. 13). As a result, by using the first CO for printer, a normal Wi-Fi connection can be established between the printer 100 and the AP 6 (T20 of FIG. 2). On the other hand, in a case where the PRes including the obtained MAC address "macpr2" includes the P2P information (T933), the terminal 10 determines that the printer 100 is to establish a WFD connection with the terminal 10, sends, to the printer 100, the second CO for printer for the printer 100 to establish a WFD connection with the terminal 10 (T1110 of FIG. 17), and can establish a WFD connection with the printer 100 by using the second CO for printer (T60 of FIG. 3). Thus, it is possible to appropriately switch whether a normal Wi-Fi connection is to be established between the printer 100 and the AP 6 or a WFD connection is to be established between the printer 100 and the terminal 10.

Case C; FIG. 19

Next, a case C in which the notification screen is displayed in the terminal 10 will be described with reference to FIG. 19. In an initial state of FIG. 19, the terminal 10 does not store the CO for terminal in the memory 34.

T1300 to T1333 are the same as T500 to T533 of FIG. 11. That is, the terminal 10 obtains the public key PPK1 of the printer 100, the channel list L2, and the MAC address "macpr1" by capturing the first QR code displayed in the printer 100, sends a PReq by broadcast, and receives, from the printer 100, a PRes including the MAC address "macpr1" and a PRes including the MAC address "macpr2" and the P2P information.

In the present case, the terminal 10 determines in T1332 that a PRes including the MAC address "macpr1" that matches the MAC address "macpr1" obtained in T1324 has been received (YES in S20 of FIG. 4). Next, the terminal 10 determines that this PRes does not include the P2P information (NO in S25) and determines to execute the normal Wi-Fi process (S30). However, since the CO for terminal is not stored in the memory 34 of the terminal 10, the terminal 10 determines that communication according to the DPP scheme has not been executed between the terminal 10 and the AP 6 (NO in S100 of FIG. 5) and displays the notification screen in T1340 (S103). When the process of T1340 completes, the process of case C ends.

Correspondence Relationships

The terminal 10, the printer 100, and the AP 6 are examples of "terminal device", "communication device", and "external device", respectively. The Wi-Fi I/F 16, the CPU 32, and the app 38 are examples of "wireless interface" of "terminal device", "processor" of "terminal device", and "computer-readable instructions" for "terminal device", respectively. The public key PPK1 (or PPK2) of the printer 100, the MAC address "macpr1" of the printer 100, and the MAC address "macpr2" of the printer 100 are examples of "public key", "first identification information", and "second identification information", respectively. The PReq, the PRes, the AReq of T610 in FIG. 12 (or of T1010 in FIG. 16), and the ARes of T620 (or of T1020) are examples of "search signal", "search response", "authentication request", and "authentication response", respectively. The first CO for printer and the second CO for printer are examples of "first connection information" and "second connection information", respectively. The P2P information is an example of "predetermined information". The Wi-Fi I/F 116 is an example of "wireless interface" of "communication device". The print data is an example of "target data".

The process of S5, the process of S10, the process of S25 in FIG. 4, the process of T610 in FIG. 12 (or T1010 in FIG. 16), the process of T620 (or T1020), the process of T710 in FIG. 13, the process of T1110 in FIG. 17, and the process of T60 in FIG. 3 are examples of processes executed by "obtain a public key", "search for the communication device", "determine whether the communication device is to establish the wireless connection with the external device or the communication device is to establish the wireless connection with the terminal device", "send an authentication request", "receive an authentication response", "send first connection information", "send second connection information", and "establish the wireless connection with the communication device", respectively.

(Variant 1) In T12 of FIG. 2 (or T52 of FIG. 3), the terminal 10 may execute the PDis (T13 or T53) with the printer 100 before executing the BS with the printer 100. That is, "search for the communication device" may include searching for the communication device before the public key and the target identification information are obtained from the communication device.

(Variant 2) In S25 of FIG. 4, the terminal 10 may determine, for example, whether the Pres includes first information indicating that the printer 100 is to establish a normal Wi-Fi connection or second information indicating that the printer 100 is to establish a WFD connection, instead of the P2P information. In this case, the terminal 10 executes the normal Wi-Fi process in S30 in a case where the received Pres includes the first information, while it executes the WFD process in S35 in a case where the received Pres includes the second information. In the present variant, the second information is an example of "predetermined information".

(Variant 3) The printer 100 may be provided with physically two I/Fs including an I/F for establishing a normal Wi-Fi connection (hereinbelow simply termed "normal Wi- Fi I/F") and an I/F for establishing a WFD connection (hereinbelow simply termed "WFD I/F"). In this case, the MAC address "macpr1" may be assigned to the normal Wi-Fi I/F, and the MAC address "macpr2" may be assigned to the WFD I/F. That is, "first MAC address" and "second MAC address" may not be assigned to physically one wireless interface provided in the communication device.

(Variant 4) In case B of FIG. 3, the terminal 10 may establish a normal Wi-Fi connection with the printer 100 that is operating, for example, as a SoftAP according to a scheme different from the WFD scheme (e.g., the normal Wi-Fi scheme). That is, "establish the wireless connection with the communication device" may include establishing a wireless connection with the communication device according to a scheme different from the WFD scheme.

(Variant 5) The processes of T101 in FIG. 7, T921 in FIG. 15, and T1321 in FIG. 19 may be omitted. In the present variant, "receive an obtaining instruction" may be omitted.

(Variant 6) The MAC address "macpr1" of the printer 100 for establishing a normal Wi-Fi connection may include a character string (e.g., "aaa") indicating that the printer 100 is to establish a normal Wi-Fi connection, and the MAC address "macpr2" of the printer 100 for establishing a WFD connection may include a character string (e.g., "bbb") indicating that the printer 100 is to establish a WFD connection. That is, "macpr1-aaa" may be assigned to the Wi-Fi I/F 116 of the printer 100 as a MAC address for establishing a normal Wi-Fi connection, and "macpr2-bbb" may be assigned to the Wi-Fi I/F 116 as a MAC address for establishing a WFD connection. In this case, in S25 of FIG. 4, the terminal 10 determines whether the target MAC address in the received PRes includes the character string "bbb". In a case where the target MAC address includes the character string "aaa", the terminal 10 determines NO in S25 and executes the normal Wi-Fi process in S30, while in a case where the target MAC address includes the character string "bbb", the terminal 10 determines YES in S25 and executes the WFD process in S35. In the present variant, the character string "bbb" is an example of "predetermined information".

(Variant 7) The terminal 10 may comprise a wireless interface different from the Wi-Fi I/F 16 (e.g., an NFC (Near Field Communication) I/F, a Bluetooth (registered trademark) I/F). This Bluetooth I/F includes a wireless interface configured to execute communication according to Bluetooth scheme version 4.0 and higher. In this case, in T524 of FIG. 11, the terminal 10 may receive the public key PPK1, the channel list L2, and the MAC address "macpr1" from the printer 100 via this wireless interface, for example. That is, "obtain a public key" may include obtaining the public key and the target identification information from the communication device by executing wireless communication.

(Variant 8) The processes of T30 to T40 in FIG. 2 and the processes of T70 to T80 in FIG. 3 may be omitted. In the present variant, "send target data to the communication device via the wireless interface through the external device" and "send the target data to the communication device via the wireless interface not through the external device" may be omitted.

(Variant 9) The processes of T42 to T48 in FIG. 2 and the processes of T82, T84 in FIG. 3 may be omitted. In the present variant, "send a disconnection instruction" and "disconnect the wireless connection" may be omitted.

(Variant 10) In case A of FIG. 2, a wireless connection may be established between the printer 100 and a parent station device different from the AP 6 (e.g., a device operating as a SoftAP, a device operating as a G/O). That is, "external device" is not limited to the AP 6, and may be any device that operates as a parent station of a wireless network.

(Variant 11) In the above embodiments, the printer 100 displays the first QR code or the second QR code according to the selection by the user in the selection screen. However, in a variant, one of the first QR code and the second QR code may be adhered to a housing of the printer 100. In the present variant as well, the same processes as in case A are executed in a case where the first QR code is adhered to the printer 100, while the same processes as in case B are executed in a case where the second QR code is adhered to the printer 100. Therefore, it is possible to appropriately switch whether a normal Wi-Fi connection is to be established between the printer 100 and the AP 6 or a WFD connection is to be established between the printer 100 and the terminal 10. Further, in the present variant, it is possible to cause the printer 100 to establish a wireless connection with an appropriate connection target, without the user selecting whether to establish a normal Wi-Fi connection between the printer 100 and the AP 6 or establish a WFD connection between the printer 100 and the terminal 10, in neither of the terminal 10 nor the printer 100.

(Variant 12) In the above embodiments, the two MAC addresses, namely, the MAC address "macpr1" for establishing a normal Wi-Fi connection and the MAC address "macpr2" for establishing a WFD connection, are assigned to the Wi-Fi I/F 116 of the printer 100. However, no limitation is placed thereon, and one MAC address (e.g., "macpr3") may be assigned. In this case, the Wi-Fi I/F 116 is capable of operating in one of a first mode for establishing a normal Wi-Fi connection and a second mode for establishing a WFD connection. In response to the "Connection with AP" button being selected by the user in T510 of FIG. 11, the printer 100 shifts to the first mode and executes the process of case A by using the MAC address "macpr3" instead of the MAC address "macpr1". Further, in response to the "Connection with terminal" button being selected by the user in T910 of FIG. 15, the printer 100 shifts to the second mode and executes the process of case B by using the MAC address "macpr3" instead of the MAC address "macpr2". In the present variant, the MAC address "macpr3" is an example of "first identification information" and "second identification information". That is, "first identification information" and "second identification information" may be the same information.

(Variant 13) "Communication device" may not be the printer 100, and may be another device such as a scanner, a multi-function device, a mobile terminal, a PC, a server, etc. Further, "external device" may not be the AP 6, and may be another device such as a printer, a scanner, a mobile terminal, a PC, a server, etc.

(Variant 14) The processes (e.g., T201 of FIG. 8) for creating a shared key (e.g., SK1) are not limited to the processes of the above-described embodiments according to the ECDH, and may be other processes according to the ECDH. Further, the processes for creating a shared key are not limited to processes according to the ECDH, and may be according to another scheme (e.g., DH (Diffie-Hellman key exchange), etc.). Further, in the above embodiments, the digital signatures (DSap, etc.) are created according to the ECDSA, however, they may be created according to another scheme (e.g., DSA (Digital Signature Algorithm), RAS (Rivest-Shamir-Adleman cryptosystem, etc.).

(Variant 15) The first (or second) QR code displayed in the printer 100 in T512 of FIG. 11 (or T912 of FIG. 15) may not have the channel list L2 encoded therein. That is, the first QR code may be a code image obtained by encoding at least the public key PPK1 (or PPK2) and the MAC address "macpr1" (or "macpr2"). In this case, in response to displaying the first QR code in T512, the printer 100 monitors reception of an AReq by using one wireless channel among all the wireless channels that the printer 100 can use, for example. Further, in T610 of FIG. 11, the terminal 10 sequentially sends the AReq by broadcast by sequentially using all the wireless channels that the terminal 10 can use. That is, "QR code" may be an image obtained by encoding at least "public key" and "target identification information".

(Variant 16) In the above embodiments, the respective processes of FIGS. 2 to 19 are implemented by software (i.e., the programs 36, 38). Instead of this, one or more of the processes may be implemented by hardware such as a logic circuit.

What is claimed is:

1. A non-transitory computer-readable medium storing computer-readable instructions for a terminal device, wherein the computer-readable instructions, when executed by a processor of the terminal device, cause the terminal device to:
    obtain from a communication device a public key of the communication device and target identification information identifying the communication device, the target identification information being one of first identification information identifying the communication device and second identification information identifying the communication device, the first identification information being for the communication device to establish a wireless connection with an external device that is different from the terminal device, the second identification information being for the communication device to establish a wireless connection with the terminal device, the second identification information being different from the first identification information;
    after the public key and the target identification information have been obtained from the communication device, send an authentication request in which the public key is used, to the communication device via a wireless interface of the terminal device;
    after the authentication request has been sent to the communication device, receive an authentication response, which is a response to the authentication request, from the communication device via the wireless interface;
    in a case where the target identification information is the first identification information and the authentication response is received from the communication device, send first connection information to the communication device via the wireless interface, the first connection information being for the communication device to establish the wireless connection with the external device;
    in a case where the target identification information is the second identification information and the authentication response is received from the communication device, send second connection information different from the first connection information to the communication device via the wireless interface, the second connection information being for the communication device to establish the wireless connection with the terminal device; and
    after the second connection information has been sent to the communication device, establish the wireless connection with the communication device via the wireless interface by using the second connection information.

2. The non-transitory computer-readable medium as in claim 1, wherein
    the first identification information does not include predetermined information,
    the second identification information includes the predetermined information,
    the first connection information is sent to the communication device in a case where the target identification information does not include the predetermined information, and
    the second connection information is sent to the communication device in a case where the target identification information includes the predetermined information.

3. The non-transitory computer-readable medium as in claim 2, wherein
    the predetermined information is a predetermined character string,
    the first identification information is a MAC address not including the predetermined character string, and
    the second identification information is a MAC address including the predetermined character string.

4. The non-transitory computer-readable medium as in claim 1, wherein the computer-readable instructions, when executed by the processor, further cause the terminal device to:
    search for the communication device via the wireless interface after the public key and the target identification information have been obtained from the communication device.

5. The non-transitory computer-readable medium as in claim 1, wherein the computer-readable instructions, when executed by the processor, further cause the terminal device to send a search signal via the wireless interface,
    in a case where a search response including the target identification information is received from the communication device via the wireless interface, any one of the first connection information and the second connection information is sent to the communication device, and
    in a case where the search response including the target identification information is not received from the communication device via the wireless interface, any one of the first connection information and the second connection information is not sent to the communication device.

6. The non-transitory computer-readable medium as in claim 5, wherein the search signal is a Probe Request.

7. The non-transitory computer-readable medium as in claim 1, wherein the computer-readable instructions, when executed by the processor, further cause the terminal device to send a search signal via the wireless interface,
    in a case where a search response including the target identification information is received from the communication device via the wireless interface and the search response does not include predetermined information, the first connection information is sent to the communication device, and
    in a case where the search response including the target identification information is received from the communication device via the wireless interface and the search response includes the predetermined information, the second connection information is sent to the communication device.

8. The non-transitory computer-readable medium as in claim 7, wherein the search signal is a Probe Request.

9. The non-transitory computer-readable medium as in claim 1, wherein the wireless connection with the communication device via the wireless interface by using the second connection information is established according to a Wi-Fi Direct scheme.

10. The non-transitory computer-readable medium as in claim 1, wherein the public key and the target identification information are obtained from the communication device by capturing a QR code (registered trademark) displayed in the communication device by using a camera of the terminal device, the QR code being obtained by coding the public key and the target identification information.

11. The non-transitory computer-readable medium as in claim 1, wherein the computer-readable instructions, when executed by the processor, further cause the terminal device to:

receive, from a user, an obtaining instruction for obtaining the public key and the target identification information from the communication device, without receiving, from the user, an instruction for selecting whether the communication device is to establish the wireless connection with the external device or the communication device is to establish the wireless connection with the terminal device, wherein in a case where the obtaining instruction is received from the user, the public key and the target identification information are received from the communication device.

12. The non-transitory computer-readable medium as in claim 1, wherein the computer-readable instructions, when executed by the processor, further cause the terminal device to:

establish the wireless connection with the external device via the wireless interface;

after the wireless connection with the external device has been established and the first connection information has been sent to the communication device, send target data to the communication device via the wireless interface through the external device; and after the wireless connection with the communication device has been established, send the target data to the communication device via the wireless interface not through the external device.

13. The non-transitory computer-readable medium as in claim 12, wherein the computer-readable instructions, when executed by the processor, further cause the terminal device to:

in a case where the target data is sent to the communication device through the external device, send a disconnection instruction to the communication device via the wireless interface through the external device, the disconnection instruction being for disconnecting the wireless connection between the communication device and the external device; and in a case where the target data is sent to the communication device not through the external device, disconnect the wireless connection between the communication device and the terminal device.

14. A terminal device comprising:

a processor; and a memory storing computer-readable instructions, wherein the computer-readable instructions, when executed by the processor, cause the terminal device to:

obtain a public key of a communication device and target identification information identifying the communication device from the communication device, the target identification information being one of first identification information identifying the communication device and second identification information identifying the communication device, the first identification information being for the communication device to establish a wireless connection with an external device that is different from the terminal device, the second identification information being for the communication device to establish a wireless connection with the terminal device, the second identification information being different from the first identification information;

after the public key and the target identification information have been obtained from the communication device, send an authentication request, in which the public key is used, to the communication device via a wireless interface of the terminal device;

after the authentication request has been sent to the communication device, receive an authentication response, which is a response to the authentication request, from the communication device via the wireless interface;

in a case where the target identification information is the first identification information and the authentication response is received from the communication device, send first connection information to the communication device via the wireless interface, the first connection information being for the communication device to establish the wireless connection with the external device;

in a case where the target identification information is the second identification information and the authentication response is received from the communication device, send second connection information different from the first connection information to the communication device via the wireless interface, the second connection information being for the communication device to establish the wireless connection with the terminal device; and after the second connection information has been sent to the communication device, establish the wireless connection with the communication device via the wireless interface by using the second connection information.

* * * * *